(12) United States Patent
Kim et al.

(10) Patent No.: US 12,520,350 B2
(45) Date of Patent: Jan. 6, 2026

(54) USER LOCATION DETECTION METHOD, VEHICLE ELECTRONIC DEVICE PERFORMING SAME, AND MOBILE DEVICE PERFORMING SAME

(71) Applicant: SAMSUNG ELECTRONICS CO., LTD., Suwon-si (KR)

(72) Inventors: Youngil Kim, Suwon-si (KR); Sangchul Ku, Suwon-si (KR); Hyunsik Ki, Suwon-si (KR); Junhong Kim, Suwon-si (KR); Sanghoon Lee, Suwon-si (KR); Woong Lee, Suwon-si (KR); Junhyun Yim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 265 days.

(21) Appl. No.: 18/122,183

(22) Filed: Mar. 16, 2023

(65) Prior Publication Data
US 2023/0224981 A1    Jul. 13, 2023

Related U.S. Application Data

(63) Continuation of application No. PCT/KR2021/012604, filed on Sep. 15, 2021.

(30) Foreign Application Priority Data

Sep. 16, 2020 (KR) .................. 10-2020-0119426

(51) Int. Cl.
*H04W 12/50* (2021.01)
*H04R 1/32* (2006.01)
(Continued)

(52) U.S. Cl.
CPC ............ *H04W 76/10* (2018.02); *H04R 1/326* (2013.01); *H04R 1/403* (2013.01); *H04R 3/04* (2013.01);
(Continued)

(58) Field of Classification Search
CPC ....... H04W 76/10; H04W 4/40; H04W 12/50; H04R 1/326; H04R 1/403; H04R 3/04;
(Continued)

(56) References Cited

U.S. PATENT DOCUMENTS

| 5,653,462 A | 8/1997 | Breed et al. |
| 6,580,914 B1 * | 6/2003 | Smith ..................... H04W 4/02 455/437 |

(Continued)

FOREIGN PATENT DOCUMENTS

| JP | 11151970 A | 6/1999 |
| JP | 2003248045 A | 9/2003 |

(Continued)

OTHER PUBLICATIONS

Korean Office Action Issued in KR Application No. 10-2020-0119426; Mail Date Jan. 19, 2025; 83 Pages.

(Continued)

*Primary Examiner* — Dominic E Rego
(74) *Attorney, Agent, or Firm* — CANTOR COLBURN LLP

(57) ABSTRACT

An embodiment of the disclosure relates to a method of detecting the location of a user located in a vehicle, the method including performing pairing between a mobile device of the user and the vehicle, outputting a plurality of sound wave signals respectively from a plurality of speakers located in the vehicle, the plurality of sound wave signal being different from each other in at least one of a frequency band and a time period, and obtaining user location information which is information about a user location detected based on an audio signal received by the mobile device in correspondence to the plurality of sound wave signals.

14 Claims, 31 Drawing Sheets

(51) Int. Cl.
  *H04R 1/40* (2006.01)
  *H04R 3/04* (2006.01)
  *H04R 3/12* (2006.01)
  *H04W 76/10* (2018.01)

(52) U.S. Cl.
  CPC .......... *H04R 3/12* (2013.01); *H04R 2420/07* (2013.01); *H04R 2499/11* (2013.01); *H04R 2499/13* (2013.01)

(58) Field of Classification Search
  CPC .. H04R 3/12; H04R 2420/07; H04R 2499/11; H04R 2499/13; B60R 16/037; B60R 25/31; B60R 16/023; B60R 25/10; B60R 25/241; B60Y 2400/301
  See application file for complete search history.

(56) References Cited

U.S. PATENT DOCUMENTS

| | | | |
|---|---|---|---|
| 9,042,524 B2* | 5/2015 | Brutin | H04M 3/42221 455/575.1 |
| 10,471,932 B2 | 11/2019 | Kim et al. | |
| 10,547,736 B2 | 1/2020 | Hannon et al. | |
| 10,783,889 B2 | 9/2020 | Ramic et al. | |
| 11,427,158 B2 | 8/2022 | Cho | |
| 2008/0134868 A1* | 6/2008 | Goldman | F42D 5/04 89/1.13 |
| 2011/0195699 A1 | 8/2011 | Tadayon et al. | |
| 2012/0095779 A1* | 4/2012 | Wengrovitz | G16H 10/60 705/3 |
| 2014/0219483 A1* | 8/2014 | Hong | H04R 5/02 381/307 |
| 2015/0036860 A1* | 2/2015 | Malcolm | C02F 1/005 381/345 |
| 2015/0149042 A1 | 5/2015 | Cooper et al. | |
| 2015/0189378 A1* | 7/2015 | Soundararajan | H04N 21/44222 725/12 |
| 2016/0044276 A1* | 2/2016 | Shearman | A42B 3/042 348/207.1 |
| 2016/0204886 A1* | 7/2016 | Hong | H04B 17/318 455/67.13 |
| 2016/0266235 A1 | 9/2016 | Hannon et al. | |
| 2017/0201192 A1* | 7/2017 | Tumpold | H04R 7/06 |
| 2018/0070291 A1 | 3/2018 | Breaux et al. | |
| 2018/0137937 A1* | 5/2018 | Gass | G16H 40/40 |
| 2019/0065138 A1* | 2/2019 | Ryckman | H03G 9/005 |
| 2019/0069266 A1* | 2/2019 | Han | H04W 64/003 |
| 2019/0079176 A1* | 3/2019 | Weissman | G01S 5/0036 |
| 2019/0144114 A1* | 5/2019 | Chen | G07C 5/06 701/2 |
| 2019/0199850 A1 | 6/2019 | Hannon et al. | |
| 2019/0362590 A1* | 11/2019 | Froy | G07F 17/3209 |
| 2020/0152179 A1* | 5/2020 | van Hout | G10L 15/22 |
| 2021/0097965 A1* | 4/2021 | Hermanson | G10H 1/0008 |
| 2021/0104134 A1* | 4/2021 | Kurtovic | B60Q 9/00 |
| 2021/0272249 A1 | 9/2021 | Han et al. | |
| 2022/0208209 A1* | 6/2022 | Zheng | G10L 25/60 |

FOREIGN PATENT DOCUMENTS

| | | |
|---|---|---|
| JP | 2009140445 A | 6/2009 |
| JP | 2012002031 A | 1/2012 |
| JP | 2017041177 A | 2/2017 |
| KR | 100507187 B1 | 8/2005 |
| KR | 20160087815 A | 7/2016 |
| KR | 20180021900 A | 3/2018 |
| KR | 101884740 B1 | 8/2018 |
| KR | 20190100593 A | 8/2019 |
| KR | 20200070146 A | 6/2020 |
| KR | 102354169 B1 | 1/2022 |
| WO | 2019106748 A1 | 6/2019 |

OTHER PUBLICATIONS

International Search Report and Written Opinion for International Application No. PCT/KR2021/012604; International Filing Date Sep. 15, 2021; Date of Mailing Jan. 3, 2022; 86 Pages.
European Search Report corresponding to Application No. 21869712.6; Issue Date: Jan. 30, 2024; pp. 7.
European Office Action Issued in EP Patent Application No. 21869712.6-1218, Issue Date May 30, 2025, 4 Pages.
Korean Office Action Issued In KR Application No. 10-2020-0119426; Mail Date Sep. 10, 2025; 16 Pages.

* cited by examiner

USER LOCATION DETECTION METHOD, VEHICLE ELECTRONIC DEVICE PERFORMING SAME, AND MOBILE DEVICE PERFORMING SAME

CROSS-REFERENCE TO RELATED APPLICATIONS

This application is a continuation of International Application No. PCT/KR2021/012604, designating the United States, filed on Sep. 15, 2021, at the Korean Intellectual Property Receiving Office and claims priority to Korean Patent Application No. 10-2020-0119426, filed on Sep. 16, 2020, at the Korean Intellectual Property Office, the disclosures of which are incorporated by reference herein in their entireties.

TECHNICAL FIELD

An embodiment of the disclosure relates to a method for detecting a user's location, a vehicle electronic device performing the method, and a mobile device performing the method.

Specifically, the embodiment of the disclosure relates to a method of detecting a location of a specific user located in a vehicle, a vehicle electronic device performing the method, and a mobile device performing the method.

BACKGROUND ART

Various functions have been developed and applied to further increase the demand and convenience of users who use vehicle.

Specifically, for the convenience of users, various functions or services have been developed to detect that a user rides in a vehicle and provide a service corresponding thereto.

Specifically, various entertainment services with respect to each of seats arranged in the vehicle may be provided. For example, a display device is disposed for each seat of the vehicle, and the user may receive desired content through the display device after riding in the vehicle.

Therefore, there is a need to develop a method and a device for enabling at least one user using a vehicle to receive various services more conveniently.

DISCLOSURE

Technical Problem

One or more embodiments provide a method for detecting a user's location which is capable of quickly and accurately detecting a location of a specific user riding in a vehicle, a vehicle electronic device performing the method, and a mobile device performing the method.

Specifically, one or more embodiments provide a method for detecting a user's location which is capable of quickly and accurately detecting a location of a specific user riding in a vehicle without adding a separate physical device or software device for detecting the location of the specific user in the vehicle, a vehicle electronic device performing the method, and a mobile device performing the method.

Technical Solution

An embodiment of the disclosure relates to a method of detecting the location of a user located in a vehicle, the method including performing pairing between a mobile device of the user and the vehicle, outputting a plurality of sound wave signals respectively from a plurality of speakers located in the vehicle, the plurality of sound wave signals being different from each other in at least one of a frequency band and a time period, and obtaining user location information which is information about a user location detected based on an audio signal received by the mobile device in correspondence to the plurality of sound wave signals.

The obtaining of the user location information may include obtaining the user location information of the user determined based on identification information of the mobile device.

The obtaining of the user location information may include detecting the user location based on at least one of a signal strength and a reception time of at least one audio component corresponding to at least one frequency value included in the audio signal.

The performing of the pairing may include transmitting, performed by the vehicle electronic device, a signal for triggering the audio signal to be recorded in the mobile device to the mobile device.

The transmitting of the signal for triggering the audio signal may include advertising a Bluetooth Low Energy (BLE) signal requesting recording based on an event corresponding to riding of the user.

The performing of the pairing may include receiving, performed by the vehicle electronic device, a signal requesting output of the plurality of sound wave signals from the mobile device.

The identifying of the user location may include the vehicle receiving information about the audio signal, and identifying, performed by the vehicle, a seat in which the user is located among a plurality of seats disposed in the vehicle, based on the information about the audio signal.

The method for detecting a user's location may further include obtaining, performed by the mobile device, output information about the plurality of sound wave signals. The identifying/detecting of the user location may include identifying, performed by the mobile device, a seat in which the user is located among a plurality of seats disposed in the vehicle, based on the received audio signal and the output information.

The identifying of the user location may include filtering at least one audio component corresponding to at least one frequency band from the received audio signal, identifying at least one speaker corresponding to the filtered at least one audio component, and identifying a seat in the vehicle corresponding to the identified at least one speaker.

The outputting of the plurality of sound wave signals may include outputting the plurality of sound wave signals having different frequencies during a same time period.

The outputting of the plurality of sound wave signals may include outputting, respectively performed by the plurality of speakers, the plurality of sound wave signals having a same frequency at a plurality of different time points.

The outputting of the plurality of sound wave signals may include outputting, respectively performed by the plurality of speakers, the plurality of sound wave signals having a same frequency and having different sound wave patterns.

An embodiment of the disclosure includes a vehicle electronic device including an audio output unit including a plurality of speakers, a communicator configured to perform communication through a wireless communication network, and a processor configured to execute at least one instruction. The processor may control the communicator to perform pairing with a mobile device of a user located in a vehicle, control a plurality of speakers respectively to output a plurality of sound wave signals which are different from each other in at least one of a frequency band and a time period, and obtain user location information which is information about a user location detected based on an audio signal received by the mobile device in correspondence to the plurality of sound wave signals.

The user location information may be information obtained based on at least one of a signal strength and a reception time of at least one audio component corresponding to at least one frequency value included in the received audio signal.

The processor may control the communicator to transmit a signal for triggering the audio signal to be recorded in the mobile device to the mobile device.

An embodiment of the disclosure relates to a method, performed by a mobile device of a user located in a vehicle, of detecting a location of the user, the method including performing pairing between the mobile device of the user located in the vehicle and the vehicle, receiving an audio signal in correspondence to a plurality of sound wave signals respectively output from a plurality of speakers located in the vehicle, the plurality of sound wave signals being different from each other in at least one of a frequency band and a time period, and obtaining location information of the user based on the received audio signal.

The obtaining of the location information of the user may include obtaining the location information of the user based on at least one of a signal strength or a reception time of at least one audio component corresponding to at least one frequency value included in the received audio signal.

The obtaining of the location information of the user may include filtering at least one audio component corresponding to at least one frequency band in the received audio signal, identifying at least one speaker corresponding to the filtered at least one filtered audio component, and identifying a seat where the mobile device is located based on a location of the identified at least one speaker.

The method may further include transmitting a signal requesting an output of the plurality of sound wave signals to the vehicle electronic device and the mobile device starting recording.

An embodiment of the disclosure relates to a mobile device of a user located in a vehicle, the mobile device including an audio input unit, a communicator configured to perform communication through a wireless communication network, and a processor configured to execute at least one instruction. The processor may control the communicator to perform pairing with a vehicle electronic device, control the audio input unit to receive an audio signal in correspondence to a plurality of sound wave signals respectively output from a plurality of speakers located in the vehicle, the plurality of sound wave signals being different from each other in at least one of a frequency band and a time period, and obtain information about a location of the user based on the received audio signal.

DETAILED DESCRIPTION

Figure 1:
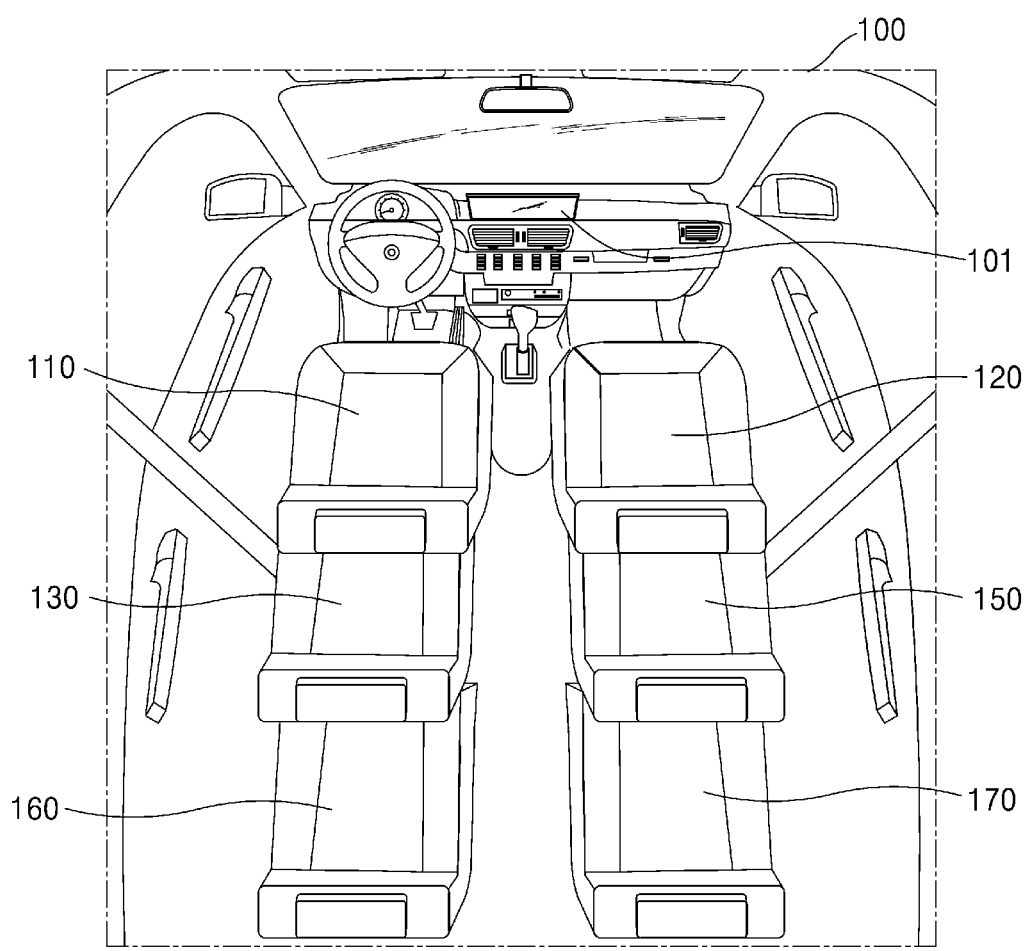
FIG. 1 is a view showing an example of the inside of a vehicle in which a user rides.

Embodiments of the disclosure will be described in detail in order to fully convey the scope of the disclosure and enable one of ordinary skill in the art to embody and practice the disclosure. The disclosure may, however, be embodied in many different forms and should not be construed as being limited to the embodiments set forth herein. In order to clearly describe the disclosure, portions that are not relevant to the description of the disclosure are omitted, and similar reference numerals are assigned to similar elements throughout the present specification.

Throughout the specification, it will be understood that when an element is referred to as being "connected" to another element, it may be "directly connected" to the other element or "electrically connected" to the other element with intervening elements therebetween. In addition, when an element is referred to as "including" a component, the element may further include other components rather than excluding other components unless specifically stated otherwise.

Thus, the expression "according to an embodiment" used in the entire disclosure does not necessarily indicate the same embodiment of the disclosure.

Some embodiments of the disclosure may be described in terms of functional block components and various processing operations. Some or all of such functional blocks may be realized by any number of hardware and/or software components configured to perform the specified functions. For example, functional blocks according to the disclosure may be realized by one or more microprocessors or by circuit components for a certain function. In addition, for example, functional blocks according to the disclosure may be implemented with any programming or scripting language. The functional blocks may be implemented using various algorithms executed on one or more processors. Furthermore, the disclosure may employ techniques of the related art for electronic environment setting, signal processing, and/or data processing. The terms such as a module, a configuration, etc. are used in a broad sense and are not limited to mechanical or physical components.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical apparatus.

Also, the expression "at least one of a, b or c" indicates only a, only b, only c, both a and b, both a and c, both b and c, all of a, b, and c, or variations thereof.

A method for detecting user's location, a vehicle electronic device performing the method, and a mobile device performing the method according to an embodiment of the disclosure will be described in detail below with reference to the accompanying drawings. In the accompanying drawings, the same components are illustrated by using the same reference numerals. In addition, throughout the detailed description, the same components are described with the same terms.

FIG. 1 is a view showing an example of the inside of a vehicle in which a user rides.

Referring to FIG. 1, the inside of a vehicle 100 is shown.

Inside the vehicle 100, a plurality of seats are arranged so that a number of users may sit on the seats. In the accompanying drawings, including FIG. 1, a case where six seats are disposed inside the vehicle 100 will be described as an example. In addition, various numbers of seats, such as 2, 4, 5, 7, and 9 seats, etc., may be disposed inside the vehicle 100.

Referring to the example shown in FIG. 1, a driver seat 110, an passenger seat 120, a seat 130 immediately behind the driver seat 110, a seat 150 immediately behind the passenger seat 120, a last row seat 160 on the side of the driver seat 110, and a last row seat 170 on the side of the passenger seat 120 may be disposed in the vehicle 100. Hereinafter, for convenience of explanation, the passenger seat 120, the seat 130 immediately behind the driver seat 110, the seat 150 immediately behind the passenger seat 120, the last row seat 160 on the side of the driver seat 110, and the last row seat 170 on the side of the passenger seat 120 are referred to as the first seat 120, the second seat 130, the third seat 150, the fourth seat 160, and the fifth seat 170, respectively.

In addition, for convenience of description, among at least one user who rides in the vehicle 100, a user who rides in a driver seat is referred to as a 'driver', and users sitting in the first seat 120, the second seat 130, the third seat 150, the fourth seat 160, and the fifth seat 170 are respectively referred to as a 'first user', a 'second user', a 'third user', a 'fourth user', and a 'fifth user'.

As described above, for the convenience of a user, various functions or services have been developed to detect that the user rides in a vehicle and provide a service corresponding thereto.

A vehicle electronic device (not shown in FIG. 1) according to an embodiment of the disclosure refers to an electronic device for detecting a location of a user who rides in a vehicle, and may be included or disposed in the vehicle. Specifically, the vehicle electronic device (not shown) may be a computing device capable of detecting a location of the user and providing or performing a service, function, or setting corresponding to the location.

For example, the vehicle electronic device may be an electronic device implementing in-vehicle infotainment (IVI) technology. Hereinafter, in-vehicle infotainment will be abbreviated as 'IVI'.

An IVI system refers to a system that allows users (drivers and/or passengers) to display or use various information or contents that may be provided in a vehicle, such as radio, navigation, voice commands, automatic safety diagnosis, and content viewed in the vehicle so as to easily and conveniently recognize the information or contents.

Here, infotainment is a term combining information and entertainment, and may be a term collectively referring to both information and entertainment. That is, the IVI system may refer to a system that allows information to be used happily and conveniently like entertainment. The IVI system is a system increasing the enjoyment and convenience of a user of a vehicle. Therefore, the IVI system has been developed with an objective to increase the convenience of the user.

For example, the first user may watch or receive various contents by using the display 101 disposed in front of the driver seat 110 and the front passenger seat 120. In addition, the second user may watch or receive various contents by using a display (not shown) attached to the back of the driver seat 110. In addition, the third user may watch or receive various contents using a display (not shown) attached to the back of the passenger seat 120. In addition, the fourth user may watch or receive various contents using a display (not shown) attached to the back of the second seat 130. In addition, the fifth user may watch or receive various contents using a display (not shown) attached to the back of the third seat 150.

For the convenience of the user, it is helpful to automatically provide content suitable for the user once the user sits in a seat. In this case, the vehicle 100 or the vehicle electronic device (not shown) needs to detect the user riding in the vehicle 100.

In the related art, when the user rides in the vehicle 100, in order to detect a user location, (i) a seat detection method through the vision recognition of a camera, (ii) a seat detection method using a pressure sensor of a seat, or (iii) a seat detection method using a separate physical sensor such as an ultrasound sensor, a radar sensor, etc., were used.

Here, (i) the seat detection method through the vision recognition of the camera is a method of recognizing which seat a user sits in by installing the camera at a location where the inside of the vehicle may be entirely photographed, such as a part where a rear mirror is located in the vehicle 100, and analyzing an image obtained from the installed camera by using a deep learning technique using artificial intelligence (AI) technology. In addition, (ii) the seat detection method using the pressure sensor of the seat is a method of installing at least one pressure sensor at the bottom of the seat and determining that the user sits in the seat when a sensing value of the installed pressure sensor exceeds a threshold value. In addition, (iii) the seat detection method using the physical sensor is a method of detecting a location (or the location of a seat in which the user sits) of the user by emitting ultrasound waves or specific electromagnetic waves and measuring reflected waves corresponding to the emitted waves.

In the related art described above, there is a disadvantage in that additional costs are incurred due to the need to install specific hardware or software in the vehicle 100. For example, the method (i) requires installation of the camera, and may not be used in a vehicle in which no camera is installed. In addition, the method (ii) requires the installation of the pressure sensor on each of all seats in the vehicle 100. In addition, the method (iii) requires additional installation of the separate physical sensor (e.g., an ultrasound sensor or a radar sensor) for seat detection.

In addition, the above-described related art may detect which seat the user sits in in the vehicle 100, but has a problem of being unable to determine who is a user whose location is detected. For example, a user A, a user B, and a user C, who are three users excluding the driver in the vehicle 100, sit in the first seat 120, the second seat 130, and the third seat 150, respectively. In this case, according to the related art, it is unknown which seat the user A sits in among the first seat 120, the second seat 130, and the third seat 150, and it is unknown which seat the user B sits in among the first seat 120, the second seat 130, and the third seat 150.

In an embodiment of the disclosure, the location of a specific user located in a vehicle may be quickly and accurately detected without additional installation of a separate camera, sensor, etc., by overcoming the problems of the related art. A user location detection method according to an embodiment of the disclosure, a vehicle electronic device performing the method, and a mobile device performing the method will be described in detail below with reference to FIGS. 2 to 30.

Figure 2:
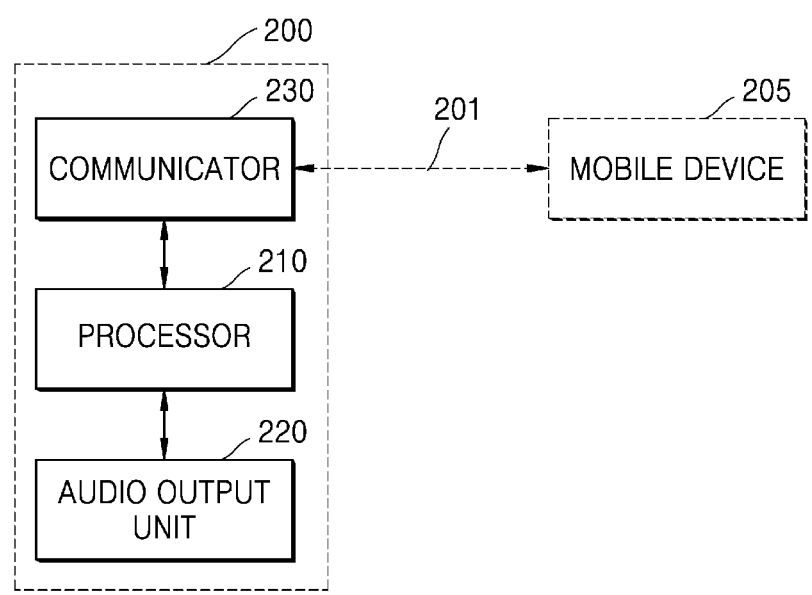
FIG. 2 is a block diagram illustrating a vehicle electronic device according to an embodiment of the disclosure.

FIG. 2 is a block diagram illustrating a vehicle electronic device according to an embodiment of the disclosure.

Referring to FIG. 2, a vehicle electronic device 200 includes a processor 210, an audio output unit 220, and a communicator 230.

The processor 210 executes at least one instruction to control an intended operation to be performed.

Here, the at least one instruction may be stored in an internal memory (not shown) included in the processor 210 or in a memory (not shown) included in the vehicle electronic device 200 separately from the processor 210.

Specifically, the processor 210 may execute the at least one instruction to control at least one component included in the vehicle electronic device 200 so that the intended operation is performed. Therefore, even though the case where the processor 210 performs certain operations is described as an example, the described example may mean that the processor 210 controls the at least one component included in the vehicle electronic device 200 so that the certain operations are performed. In addition, although the case where the processor 210 includes a single processor has been described and illustrated as an example, the processor 210 may include a plurality of processors.

In addition, the processor 210 may include a RAM (not shown) storing signals or data input from the outside of the vehicle electronic device 200 or used as a storage area corresponding to various tasks performed by the vehicle electronic device 200, a ROM (not shown) storing a control program for controlling the vehicle electronic device 200 and/or a plurality of instructions, and at least one processor 210. In addition, the processor 210 may be implemented as a system on chip (SoC) in which a core (not shown) and a GPU (not shown) are integrated. Also, the processor 210 may include multiple cores more than a single core. For example, the processor 210 may include a dual core, a triple core, a quad core, a hexa core, an octa core, a deca core, a dodeca core, a hexadecimal core, etc.

The audio output unit 220 includes a plurality of speakers.

The audio output unit 220 outputs audio (e.g., voice and sound) under the control of the processor 210.

Specifically, the audio output unit 220 may respectively output a plurality of sound wave signals through a plurality of speakers. The plurality of speakers included in the audio output unit 220 may be disposed in the vehicle and may be disposed spaced apart from each other.

Here, the sound wave signal means a sound signal or an audio signal.

Specifically, the sound wave signal may be a sound signal (or an audio signal) corresponding to a certain frequency value or a certain unit frequency period. For example, in an embodiment of the disclosure, sound wave signals may be sound signals corresponding to unit tones, such as 100 hertz (Hz), 200 Hz, and 300 Hz. Alternatively, sound wave signals may be sound signals corresponding to a frequency range of 100 to 150 Hz, a frequency range of 150 to 200 Hz, a frequency range of 200 to 2500 Hz, etc.

The sound wave signals output from the audio output unit 220 will be described in detail with reference to FIGS. 12 to 18 below.

Also, each of the plurality of speakers may output different sound wave signals. Here, that the sound wave signals are different may mean that the sound wave signals are different in terms of at least one of a frequency, a sound pressure (or the intensity of a sound wave signal or the amplitude of the sound wave signal), and/or the sound wave pattern.

In addition to the plurality of speakers, the audio output unit 220 may include at least one of a headphone output terminal (not shown) or a Sony/Philips digital interface (S/PDIF) output terminal (not shown) outputting audio. For example, the audio output unit 220 may include a combination of a plurality of speakers (not shown), a headphone output terminal (not shown), and an S/PDIF output terminal (not shown).

In addition, each of the plurality of speakers included in the audio output unit 220 may be arranged in various forms, and the number of the plurality of speakers included in the audio output unit 220 may also vary.

Also, in an embodiment of the disclosure, the audio output unit 220 may not be included in the vehicle electronic device 200, but may be a separate component included in a vehicle (not shown, 100 in FIG. 1). In this case, the vehicle electronic device 200 may be electrically connected to an audio output unit disposed in the vehicle (not shown), and the vehicle electronic device 200 may use and control an audio output unit disposed in the vehicle (not shown). Hereinafter, for convenience of description, a case where the audio output unit 220 is included in the vehicle electronic device 200 will be described as an example.

The communicator 230 may perform communication through the wireless communication network 201. Specifically, the communicator 230 may communicate with an external electronic device (not shown) through the wireless communication network 201. Here, the external electronic device (not shown) may be an external server (not shown), a mobile device 205, etc., to communicate with the vehicle electronic device 200. For example, the communicator 230 may communicate with the mobile device 205.

Although FIG. 2 shows that the communicator 230 directly communicates with the mobile device 205, the communicator 230 may communicate with the mobile device 205 through a server (not shown) for communication relay. For example, the communicator 230 may directly communicate with the mobile device 205 through a short-range communication module (not shown) for communication between electronic devices located in a short range, such as Bluetooth. As another example, the communicator 230 may perform communication using a communication relay of a server (not shown) by using a wireless communication module using a communication network based on 3rd Generation (3G), 4th Generation (4G), and/or 5th Generation (5G), millimeter waves (mmWave), etc.

In an embodiment of the disclosure, the mobile device 205 may be an electronic device owned or carried by a user in a vehicle. For example, the mobile device 205 may be a mobile computing device such as a wearable device, a smart phone, a tablet PC, a personal digital assistant (PDA), a laptop computer, a media player, a micro server, a global positioning system (GPS) device, etc.

In addition, the mobile device 205 may have different identification information for each user. Here, the identification (ID) information may be a cell phone number, user identification information (e.g., a user ID, a user name, a user nickname, etc.) stored in the mobile device 205, a unique number of the mobile device 205, a unique product number of the mobile device 205, etc. Therefore, when the mobile device 205 and the vehicle electronic device 200 perform communication, the vehicle electronic device 200 may determine the user of the mobile device 205 based on the identification information of the mobile device 205. Accordingly, the vehicle electronic device 200 according to an embodiment of the disclosure may obtain location information about a specific user based on the identification information of the mobile device 205.

For example, when the name of the user of the mobile device 205 is 'HONG GILDONG', the vehicle electronic device 200 may receive the identification information of the mobile device 205 and determine that the user of the mobile device 205 is 'HONG GILDONG', based on the received identification information. Here, the vehicle electronic device 200 may obtain the identification information of the mobile device 205 in a pairing operation. Alternatively and/or additionally, the vehicle electronic device 200 may obtain the identification information of the mobile device 205 in a process of registering the mobile device 205.

Specifically, the communicator 230 may include at least one communication module such as a short-range communication module, a wired communication module, a mobile communication module, and a broadcast receiving module. Here, the at least one communication module refers to a tuner that performs broadcast reception or a communication module capable of performing data transmission/reception through a network conforming to communication standards such as Bluetooth, wireless local area network (WLAN) (Wi-Fi), Wireless Broadband (WiBro), World Interoperability for Microwave Access (WiMax), code-division multiple access (CDMA), wideband CDMA (WCDMA), the Internet, 3G, 4G, 5G, and/or a communication scheme using mmWave.

In addition, the mobile communication module included in the communicator 230 may perform communication with another device (e.g., a server (not shown)) at a remote location through a communication network conforming to a communication standard, such as the Internet, 3G, 4G, and/or 5G. Here, a communication module that communicates with a remote server (not shown) may be referred to as a 'long-range communication module'.

In an embodiment of the disclosure, the processor 210 controls the communicator 230 to perform pairing with a mobile device of a user located in a vehicle. Then, the processor 210 controls the plurality of speakers included in the audio output unit 220 to respectively output a plurality of sound wave signals that are different in terms of at least one of a frequency band and/or a time period. The processor 210 obtains user location information. Here, the user location information may be information indicating the location of the user detected based on the audio signal received by the mobile device 205 in correspondence to the plurality of sound wave signals. For example, the user location information may be information indicating the location of a seat in which the user sits. Also, the user location information may be information determining the user and information indicating the location of a seat in the vehicle in which the user sits.

In an embodiment of the disclosure, as a prerequisite for the mobile device 205 to receive the plurality of sound wave signals output from the vehicle electronic device 200, the prerequisite may mean an operation of performing communication between the vehicle electronic device 200 and the mobile device 205. Such an operation of performing communication may be referred to as a 'pairing operation'. Here, pairing may refer to an operation of forming a wireless communication network while transmitting and receiving data necessary for a wireless communication connection between the vehicle electronic device 200 and the mobile device 205. Once pairing is completed, the plurality of sound wave signals output from the vehicle electronic device 200 may be received by and stored in the mobile device 205. In an embodiment of the disclosure, the pairing operation may be performed through a wireless network formed conforming to wireless communication standards such as Bluetooth, WLAN (Wi-Fi), WiBro, WiMax, CDMA, WCDMA, the Internet, 3G, 4G, 5G, and/or mmWAVE. In addition, signals transmitted and received in the pairing operation may be signals generated according to the wireless communication standards described above. For example, when the pairing operation is performed through a Bluetooth network conforming to the Bluetooth communication standard, a Bluetooth Low Energy (BLE) signal conforming to the Bluetooth communication standard may be transmitted and received between the vehicle electronic device 200 and the mobile device 205. The pairing operation will be described in detail with reference to FIGS. 10 and 11 below.

Figure 3:
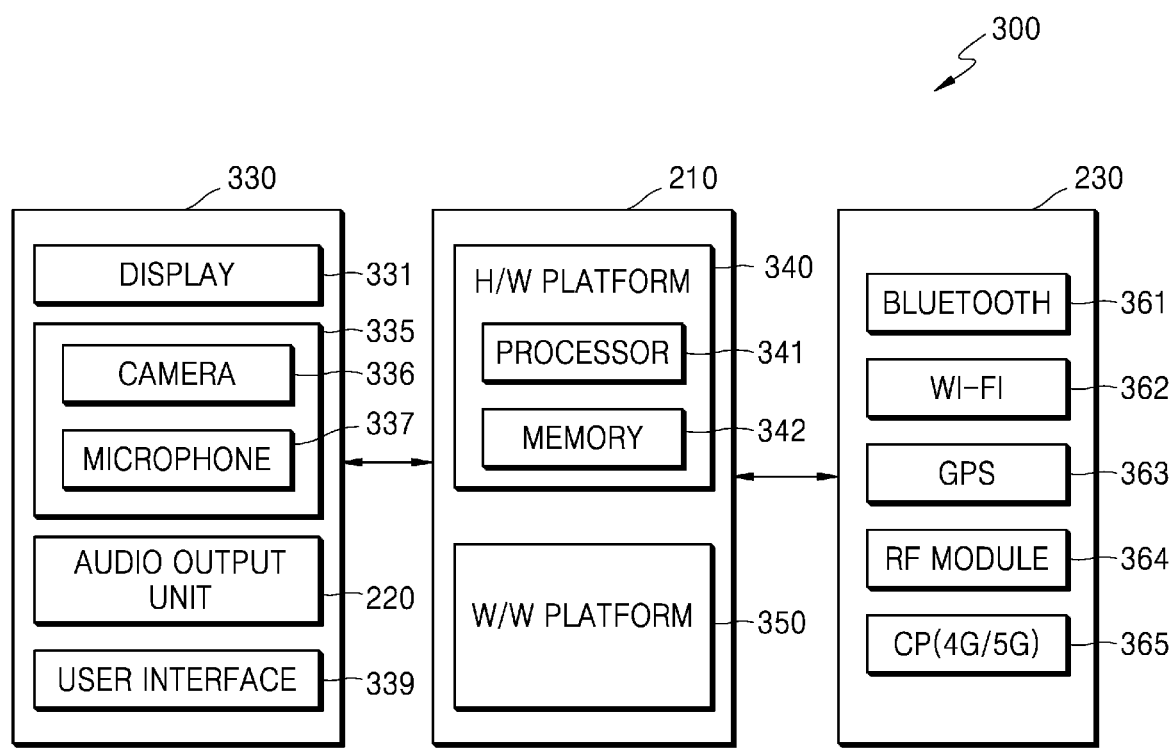
FIG. 3 is another block diagram illustrating a vehicle electronic device according to an embodiment of the disclosure.

FIG. 3 is another block diagram illustrating a vehicle electronic device according to an embodiment of the disclosure.

A vehicle electronic device 300 of FIG. 3 may correspond to the vehicle electronic device 200 described above with reference to FIG. 2. Therefore, in describing the vehicle electronic device 300, redundant descriptions with those of the vehicle electronic device 200 are omitted. In addition, in describing the vehicle electronic device 300 shown in FIG. 3, the same components as those described above with reference to FIG. 2 are illustrated by using the same reference numerals and terms.

Referring to FIG. 3, a vehicle electronic device 300 may include the processor 210, an input/output unit 330, and the communicator 230. Specifically, the vehicle electronic device 300 may be an electronic device capable of obtaining user location information indicating a user location according to an embodiment of the disclosure.

In addition, the vehicle electronic device 300 may be an electronic device implementing the IVI technology. For example, the vehicle electronic device 300 may provide services, information, and/or content customized for a particular user, based on user location information. As another example, the vehicle electronic device 300 may perform and provide settings customized for a specific user based on user location information.

The processor 210 and the input/output unit 330 included in the vehicle electronic device 300 may be collectively referred to as an IVI head unit. In addition, the vehicle electronic device 300 may be disposed between central front parts of a driver seat and a passenger seat in the vehicle.

Also, the communicator 230 may be referred to as a transmission control unit (TCU).

Here, the TCU is a component that controls transmission and reception of data in the vehicle, and may be in charge of communication between the vehicle and an external electronic device (e.g., a server, a mobile device, etc.)

The processor 210 may include components 341 implementing a hardware platform 340 (e.g., an application (AP), memory, etc.), and components 350 implementing a software platform (e.g., an OS program, automotive safety software, applications, etc.)

In detail, the components 341 implementing the hardware platform may include at least one AP and a memory 342. Here, the case where the memory 342 is included in the processor 210 has been described as an example. In addition, the memory 342 may be included as a separate component included in the vehicle electronic device 300 instead of being included in the processor 210.

In addition, as the components 341 implementing the hardware platform, a USB module (not shown), a frequency modulation (FM)/digital multimedia broadcasting (DMB) tuner (not shown), etc., may be further included. Here, the USB module (not shown) may include a USB insertion unit (not shown) to read data from a USB inserted therein. Also, the FM/DMB tuner (not shown) may selectively receive FM/DMB broadcasting signals. Specifically, the FM/DMB tuner (not shown) may be tuned to and select only a frequency of a channel desired to be received by the vehicle electronic device 300 from among a number of radio wave components by performing, for example, amplification, mixing, and resonance on a broadcast signal received in a wired or wireless manner. The broadcast signal received by the FM/DMB tuner (not shown) may include an audio, a video, and additional information (e.g., an electronic program guide (EPG)).

The components 350 for implementing the software platform may include an OS program, automotive safety software, applications, etc. Here, the OS program may include QNX, Linux, or an Android-based OS program.

The input/output unit 330 is a component providing data to a user or receiving a user request, and may include at least one of a display 331, a camera module 335, the audio output unit 220, or a user interface 339. The display 331 may correspond to the display 101 shown in FIG. 1.

The camera module 335 is a component obtaining video and/or audio data, and may include a camera 336 and a microphone 337. In addition, the camera module 335 may include a speaker (not shown) to output an operating sound of the camera 336. In addition, when the camera module 335 does not include a separate speaker (not shown), operation sound of the camera 336 may be output through the audio output unit 220.

For example, the camera module 335 may operate as a sensor recognizing a gesture and voice of a user.

Specifically, the camera 336 may receive an image (e.g., continuous frames) corresponding to a motion of the user including a gesture within the camera recognition range. For example, a recognition range of the camera 336 may be within a distance of 0.1 meter (m) to 5 m between the camera 336 and the user. The motion of the user may include, for example, a gesture or motion of a body part of the user, such as the face, a facial expression, a hand, a fist, or a finger. Under control by the processor 210, the camera 336 may convert the received image into an electrical signal to perform recognition, and may select a menu displayed on the vehicle electronic device 300 or perform control corresponding to a motion recognition result by using a recognition result corresponding to the motion of the user. For example, the processor 210 may control channel selection, channel change, volume adjustment, execution of available services, etc., in FM/DMB by using the recognition result obtained from the camera 336.

The camera 336 may be implemented integrally with or separately from the vehicle electronic device 300. The separated camera 336 may be electrically connected to the processor 210 of the vehicle electronic device 300 through the communicator 230 or the input/output unit 330. For example, when the camera 336 is implemented separately from the vehicle electronic device 300, the camera 336 may be arranged at a location corresponding to the front of the face and upper body of a driver to capture an image corresponding to the face and upper body of the driver.

The microphone 337 may receive an audio signal such as a voice signal. The microphone 337 may receive a voice signal of the user, and the processor 210 may recognize a control command corresponding to the voice received from the microphone 337 and control an operation corresponding thereto to be performed. In addition, the microphone 337 may be included in the vehicle electronic device 300 as a separate module rather than being included in the camera module 335.

The user interface 339 may receive a user input for controlling the vehicle electronic device 300. The user interface 339 may include a push button, a wheel, a keyboard, a jog dial, a touch panel, a haptic sensor, etc., receiving a user input.

The communicator 230 may include at least one of a Bluetooth module 361, a Wi-Fi module 362, a GPS module 363, an RF module 364, and/or a communication processor (CP) module 365. Here, the CP module is a modem chipset, and may perform communication with an external electronic device through a communication network conforming to 3G, 4G, or 5G communication standard. In addition, the communicator 230 may further include at least one communication module (not shown) configured to perform communication conforming to a communication standard, such as Bluetooth, Wi-Fi, BLE, near-field communication (NFC)/radio frequency identification (RFID), Wi-Fi Direct, ultra-wideband (UWB), and/or Zigbee.

In addition, the components included in the vehicle electronic device 300, for example, the processor 210, the input/output unit 330, and the communicator 230, may communicate with each other through a vehicle network. In addition, the vehicle electronic device 300 and other components included in the vehicle (not shown) may communicate with each other through the vehicle network. Here, the vehicle network may be a network based on a controller area network (CAN) and/or a media oriented systems transport (MOST).

Figure 4:
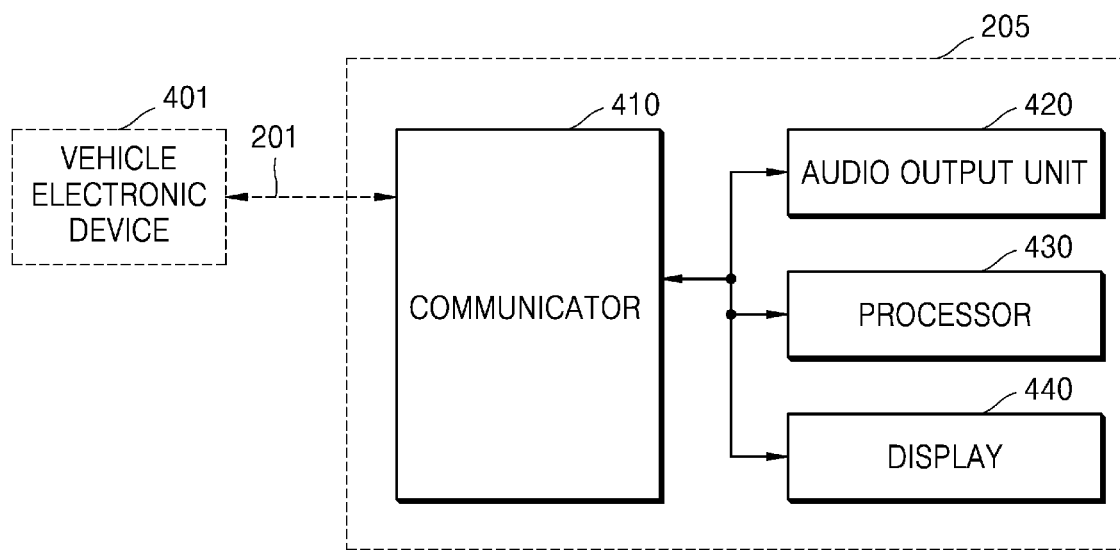
FIG. 4 is a block diagram illustrating a mobile device according to an embodiment of the disclosure.

FIG. 4 is a block diagram illustrating a mobile device according to an embodiment disclosed herein. In FIG. 4, the same components as those in FIG. 2 are illustrated by using the same reference numerals. Also, a vehicle electronic device 401 of FIG. 4 may correspond identically to the vehicle electronic device 200 or 300 shown in FIG. 2 or 3. Therefore, redundant descriptions with those described above will be omitted.

The mobile device 205 may be an electronic device that communicates with the vehicle electronic device 401 and operates to detect a location of a user inside a vehicle. Specifically, the mobile device 205 may have a form that the user may carry in the vehicle. For example, the mobile device 205 may be a mobile computing device such as a wearable device, a smart phone, a tablet PC, a personal digital assistant (PDA), a laptop computer, a media player, a micro server, a global positioning system (GPS) device, etc.

In an embodiment of the disclosure, the mobile device 205 may be a mobile computing device capable of receiving audio signals corresponding to a plurality of sound wave signals output from the vehicle electronic device 401 and processing, analyzing, and/or transmitting the received audio signals.

Referring to FIG. 4, the mobile device 205 includes a communicator 410, an audio input unit 420, and a processor 430. In addition, the mobile device 205 may further include a display 440.

The processor 430 executes at least one instruction to control an intended operation to be performed. Here, the at least one instruction may be stored in an internal memory (not shown) included in the processor 430 or in a memory (not shown) included in the mobile device 205 separately from the processor 430.

Specifically, the processor 430 may execute the at least one instruction to control at least one component included in the mobile device 205 so that the intended operation is performed. Therefore, even though the case where the processor 430 performs certain operations is described as an example, the description may mean that the processor 430 controls the at least one component included in the mobile device 205 so that the certain operations are performed.

In addition, although the case where the processor 430 includes a single processor has been described and illustrated as an example, the processor 430 may include a plurality of processors.

In addition, the processor 430 may include a RAM (not shown) storing signals or data input from the outside of the mobile device 205 or used as a storage area corresponding to various tasks performed by the mobile device 205, a ROM (not shown) storing a control program for controlling the mobile device 205 and/or a plurality of instructions, and at least one processor. In addition, the processor 430 may be implemented as a SoC in which a core (not shown) and a GPU (not shown) are integrated. Also, the processor 430 may include multiple cores more than a single core. For example, the processor 430 may include a dual core, a triple core, a quad core, a hexa core, an octa core, a deca core, a dodeca core, a hexadecimal core, etc.

The audio input unit 420 receives an audio signal. Here, the audio signal may be a signal of an audible frequency band or a signal of an inaudible frequency band, and may include at least one frequency component corresponding to at least one frequency value.

Specifically, the audio input unit 420 may include a microphone (not shown) that receives an audio signal, which is an external sound signal, and processes the audio signal into electrical data. For example, the microphone (not shown) included in the audio input unit 420 may respectively receive a plurality of sound wave signals output from a plurality of speakers disposed in the vehicle. In addition, the microphone (not shown) included in the audio input unit 420 may use various noise cancelling algorithms to remove noise generated in a process of receiving an external sound signal.

In an embodiment of the disclosure, the audio input unit 420 may receive an audio signal including a plurality of sound wave signals output from a plurality of speakers included in the vehicle electronic device 401, respectively.

In addition, according to the control of the processor 430, the audio input unit 420 may be triggered by the output of the plurality of sound wave signals from the vehicle electronic device 401 to perform operation of receiving and storing (or recording) the audio signal.

The communicator 410 may communicate with an external electronic device through the wireless communication network 201. Here, the external electronic device may be the vehicle electronic device 401, a server (not shown), another mobile device (not shown), etc.

In an embodiment of the disclosure, the communicator 410 may communicate with the vehicle electronic device 401.

In an embodiment of the disclosure, the processor 430 controls the communicator 410 to perform pairing between vehicle electronic devices. The processor 430 controls the audio input unit 420 to receive an audio signal in correspondence to a plurality of sound wave signals respectively output from a plurality of speakers located in the vehicle, the plurality of sound wave signals being different from each other in at least one of a frequency band and a time period. Also, the processor 430 obtains user location information based on the received audio signal.

In an embodiment of the disclosure, the mobile device 205 may perform at least one operation of (i) transmitting identification information of a mobile device to the vehicle electronic device 401 so that vehicle electronic device 401 may identify a mobile device of a specific user, (ii) performing an operation of receiving or storing an audio signal in correspondence to the vehicle electronic device 401 outputting sound wave signals by communicating with the vehicle electronic device 401, (iii) obtaining user location information based on the received audio signal, (iv) transmitting information about the received audio signal to the vehicle electronic device 401, and (v) extracting an audio component corresponding to a certain frequency band having an intensity greater than or equal to a limit value from the received audio signal, and based on the extracted audio component, determining at least one speaker installed in a vehicle corresponding to the user location. Operations performed by the mobile device 205 will be described in detail below with reference to the accompanying drawings.

Figure 5:
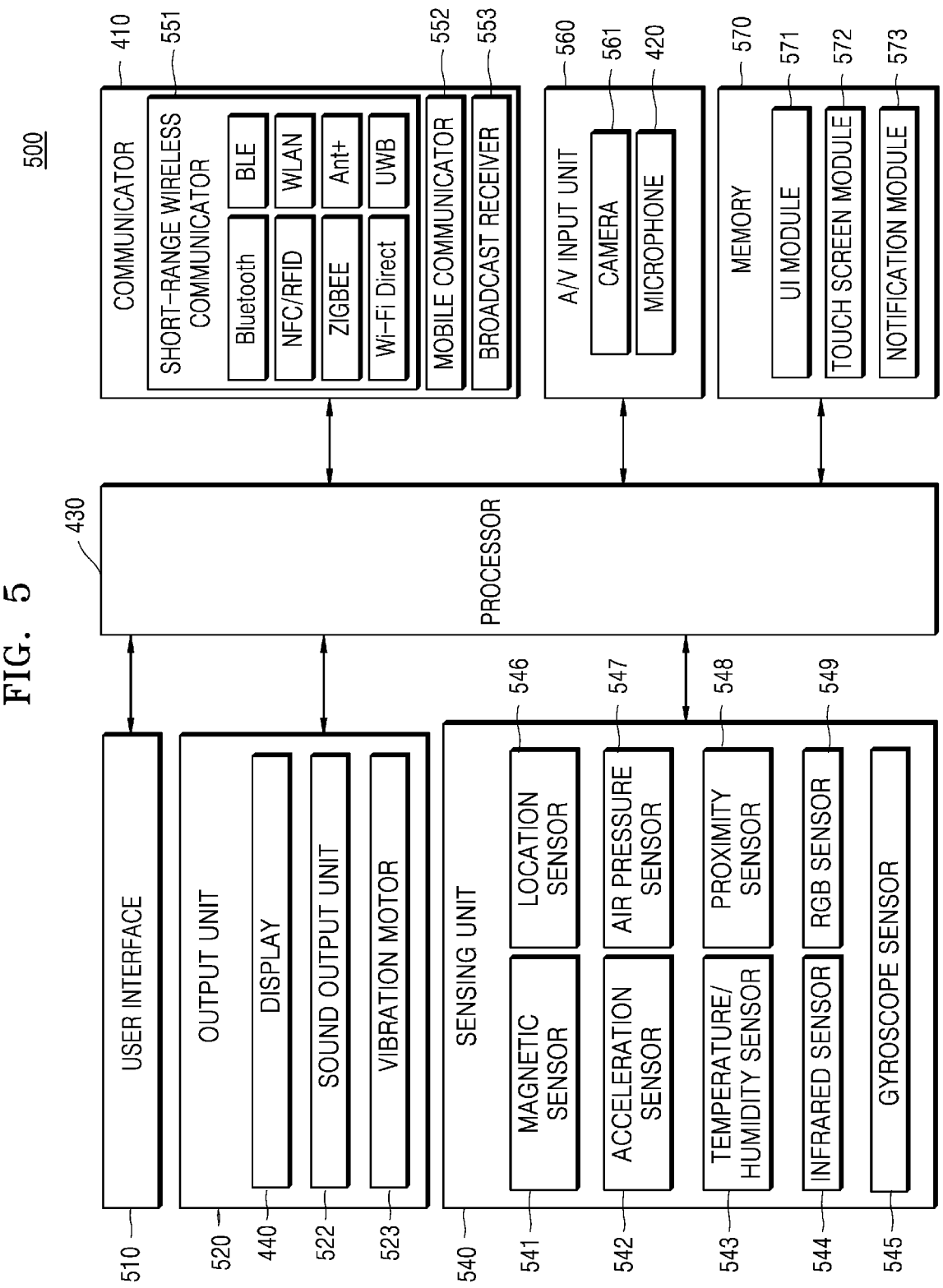
FIG. 5 is another block diagram illustrating a mobile device according to an embodiment of the disclosure.

FIG. 5 is another block diagram illustrating a mobile device according to an embodiment of the disclosure.

A mobile device 500 shown in FIG. 5 may correspond identically to the mobile device 205 described with reference to FIGS. 2 to 4. In the configurations included in the mobile device 500 shown in FIG. 5, the same components as those illustrated in FIGS. 2 to 4 are illustrated by using the same reference numerals. Therefore, in describing the mobile device 500, redundant descriptions with those of the mobile device 205 are omitted.

A user interface 510 means a means through which a user inputs data for controlling the mobile device 500. For example, the user interface 510 may include a key pad, a dome switch, a touch pad (contact capacitance method, pressure resistive film method, infrared ray sensing method, surface ultrasound wave conduction method, integral type tension measuring method, piezo effect method, etc.), a jog wheel, a jog switch, etc., but is not limited thereto.

An output unit 520 may output an audio signal, a video signal, or a vibration signal, and the output unit 520 may include the display 440, a sound output unit 522, and a vibration motor 523.

The display 440 displays and outputs information processed by the mobile device 500.

In addition, when the display 440 and a touch pad (not shown) are configured as a touch screen in a layer structure, the display 440 may be used as an input device in addition to as an output device. The display 440 may include at least one of a liquid crystal display, a thin film transistor-liquid crystal display, an organic light-emitting diode display, a flexible display, a three-dimensional (3D) display, or an electrophoretic display. Also, the mobile device 500 may include two or more displays 440 according to an implementation type of the mobile device 500. In this case, the two or more displays 440 may be disposed facing each other using a hinge.

The audio output unit 522 outputs audio data received from the communicator 410 or stored in a memory 570. In addition, the sound output unit 522 outputs sound signals related to functions (e.g., a call signal reception sound, a message reception sound, and a notification sound) performed by the mobile device 500. The sound output unit 522 may include a speaker, a buzzer, etc.

The vibration motor 523 may output a vibration signal. For example, the vibration motor 523 may output a vibration signal corresponding to an output of audio data or video data (e.g., call signal reception sound, message reception sound, etc.) Also, the vibration motor 523 may output a vibration signal when a touch is input to the touch screen.

The processor 430 typically controls overall operations of the mobile device 500. For example, the processor 430 may generally control the user interface 510, the output unit 520, the sensing unit 540, the communicator 410, and an audio/video (A/V) input unit 560 by executing programs stored in the memory 1700.

The sensing unit 540 may sense a state of the mobile device 500 or a state around the mobile device 500 and transmit sensed information to the processor 430.

The sensing unit 540 may include at least one of a magnetic sensor 541, an acceleration sensor 542, a temperature/humidity sensor 543, an infrared sensor 544, a gyroscope sensor 545, a location sensor (e.g., a GPS) 546, an air pressure sensor 547, a proximity sensor 548, an RGB sensor (an illuminance sensor) 549, and/or a biometric information detector sensor 591, but is not limited thereto. An ordinary skilled in the art may intuitively infer the function of each sensor from its name, and thus, a detailed description thereof will be omitted.

The communicator 410 may include one or more components that allow communication between the mobile device 500 and the vehicle electronic device (e.g., 401 in FIG. 4) or between the mobile device 500 and a server. For example, the communicator 410 may include a short-range wireless communicator 551, a mobile communicator 552, and a broadcast receiver 553.

The short-range wireless communicator 551 may include a Bluetooth communicator, a Bluetooth low energy (BLE) communicator, a near field communicator, a WLAN communicator, a WLAN (WiFi) communicator, a Zigbee communicator, an infrared data association (IrDA) communicator, a Wi-Fi direct (WFD) communicator, an ultra wideband (UWB) communicator, an Ant+ communicator, etc., but is not limited thereto.

The mobile communicator 552 transmits and receives a radio signal to and from at least one of a base station, an external terminal, or a server on a mobile communication network. Here, the radio signal may include various types of data according to a voice call signal, a video call signal, or a text/multimedia message transmission/reception.

The broadcast receiver 553 may receive a broadcast signal and/or broadcast-related information from outside through a broadcast channel. The broadcast channel may include a satellite channel and a terrestrial channel. Depending on implementation examples, the mobile device 500 may not include the broadcast receiver 553.

The A/V input unit 560 is for inputting an audio signal or a video signal, and may include a camera 561 and the audio input unit 420. Here, the audio input unit 420 may be formed as a microphone, and is shown as a 'microphone 420' in FIG. 5. The camera 561 may obtain an image frame such as a still image or a moving image through an image sensor in a video communication mode or a photographing mode. An image captured through an image sensor may be processed through the processor 430 or a separate image processing unit (not shown).

The image frame processed by the camera 561 may be stored in the memory 570 or transmitted to the outside through the communicator 410. Two or more cameras 561 may be provided according to the configuration of a terminal.

The microphone 420 receives an external sound signal and processes the received signal as electrical voice data. For example, the microphone 420 may receive a plurality of sound signals output respectively from a plurality of speakers included in the vehicle electronic device (e.g., 401 of FIG. 4). The microphone 420 may use various noise cancelling algorithms to remove noise generated in a process of receiving an external sound signal.

The memory 570 may store programs for processing and control of the processor 430 and may store data input to or output from the mobile device 500.

The memory 570 may include at least one type storage medium of a flash memory type, a hard disk type, a multimedia card micro type, a card type memory (e.g., SD or XD memory), RAM (Random Access Memory), SRAM (Static Random Access Memory), ROM (Read Only Memory), EEPROM (Electrically Erasable Programmable Read-Only Memory), PROM (Programmable Read-Only Memory), a magnetic memory, a magnetic disk, or an optical disk.

Programs stored in the memory 570 may be classified into a plurality of modules, for example, a UI module 571, a touch screen module 572, and a notification module 573, according to their functions.

The UI module 571 may provide a specialized UI, a GUI, etc. that interact with the mobile device 500 for each application. The touch screen module 572 may sense a touch gesture on the user on the touch screen and may transmit information about the touch gesture to the processor 430. The touch screen module 572 according to some embodiments of the disclosure may recognize and analyze a touch code. The touch screen module 572 may be configured as separate hardware including a controller.

Various sensors may be provided inside or near the touch screen to sense the touch on the touch screen or a close touch. A tactile sensor is an example of a sensor sensing the touch on the touch screen. The tactile sensor refers to a sensor sensing the touch of a specific object to a degree or more than a human feels. The tactile sensor may sense a variety of information such as roughness of a contact surface, hardness of a contact material, and temperature of a contact point.

In addition, a proximity sensor is an example of a sensor sensing a touch of a touch screen.

The proximity sensor refers to a sensor sensing the presence or absence of an object approaching a certain detection surface or an object existing in the vicinity without mechanical contact by using the force of an electromagnetic field or infrared rays. Examples of the proximity sensor include a transmissive photoelectric sensor, a direct reflection photoelectric sensor, a mirror reflection photoelectric sensor, a high-frequency oscillation proximity sensor, a capacitive proximity sensor, a magnetic proximity sensor, an infrared proximity sensor, etc. Touch gestures of the user may include a tap, a touch and hold, a double tap, a drag, a fanning, a flick, a drag and drop, a swipe, etc.

The notification module 573 may generate a signal for notifying occurrence of an event of the mobile device 500. Examples of the event occurring in the mobile device 500 include call signal reception, message reception, key signal input, schedule notification, etc. The notification module 573 may output a notification signal in the form of a video signal through the display 440, may output a notification signal in the form of an audio signal through the sound output unit 522, or may output a notification signal in the form of a vibration signal through the vibration motor 523.

Figure 6:
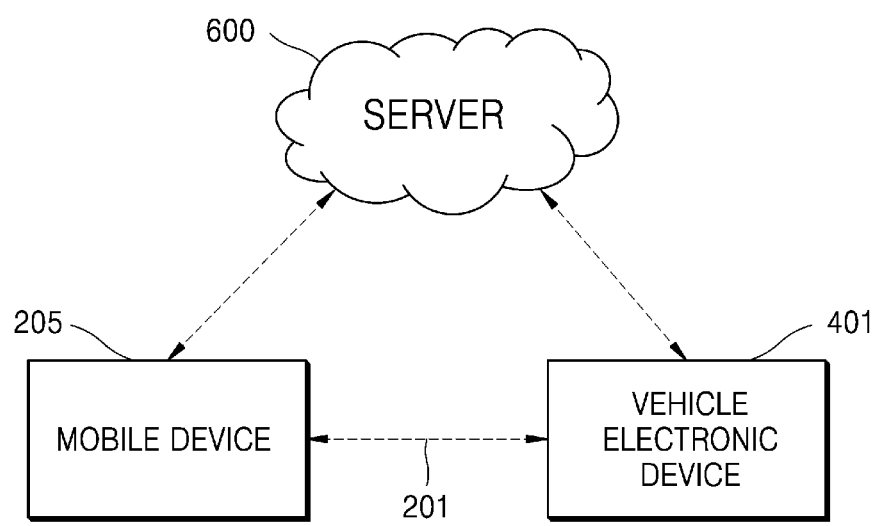
FIG. 6 is a diagram illustrating communication between a mobile device and a vehicle electronic device.

FIG. 6 is a diagram illustrating communication between a mobile device and a vehicle electronic device. In the components shown in FIG. 6, the same as in FIG. 4

In an embodiment of the disclosure, the mobile device 205 and the vehicle electronic device 401 may perform communication using a communication relay of a server 600.

Here, the server 600 may be a communication relay server supporting communication between the mobile device 205 and the vehicle electronic device 401. In addition, the server 600 may be a server providing content, information, required arithmetic processing, required control processing, etc., to at least one of the vehicle electronic device 401 or the mobile device 205.

The server 600 may be a server providing a service or supporting communication required for a video call service. For example, when each of the mobile device 205 and the vehicle electronic device 401 may access a mobile communication network such as 3G, 4G, and 5G, the server 600 may be a communication server supporting mobile communication conforming to a communication standard such as 3G, 4G, and 5G.

For example, the server 600 may relay communication between the mobile device 205 and the vehicle electronic device 401 according to the telecommunication standard. In addition, the server 600 may receive information about the audio signal received from the mobile device 205 and recognize the location of a user in the vehicle based on the received information. Information about the recognized user location may be transmitted to at least one of the mobile device 205 and/or the vehicle electronic device 401.

Figure 7:
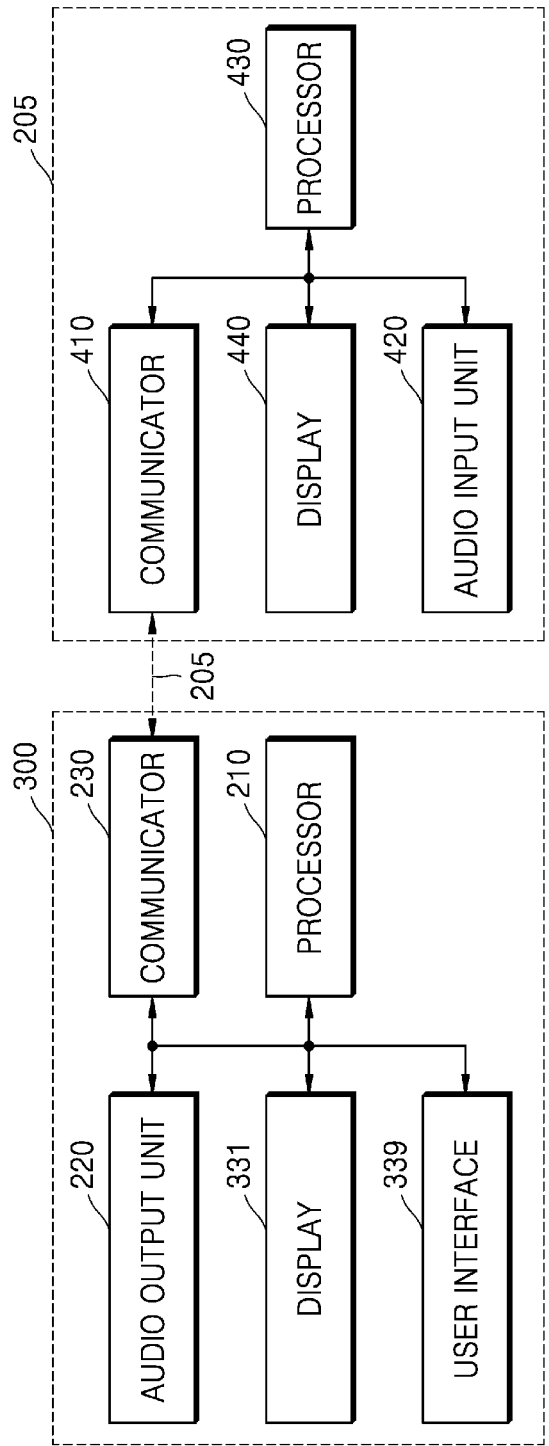
FIG. 7 is a diagram illustrating a mobile device and a vehicle electronic device performing a user location detection method according to an embodiment of the disclosure.

That is, the mobile device 205 and the vehicle electronic device 401 may communicate with each other indirectly using a communication relay of the server 600 or directly communicate with each other using a short-range communication network, etc. In FIG. 7, a case where the mobile device 205 and the vehicle electronic device (e.g., 300) directly communicate with each other using a short-range communication network such as a Bluetooth communication network will be described as an example.

FIG. 7 is a diagram illustrating a mobile device and a vehicle electronic device performing a user location detection method according to an embodiment of the disclosure. In FIG. 7, the same components as those in FIGS. 2 to 4 are illustrated by using the same reference numerals. Therefore, redundant descriptions with those described above will be omitted.

In FIG. 7, the vehicle electronic device 300 shown in FIG. 3 is described as an example of the vehicle electronic device according to an embodiment of the disclosure. Accordingly, the vehicle electronic device 300 shown in FIG. 7 may be the vehicle electronic device 200 shown in FIG. 2. In addition, for convenience of description, in FIG. 7, some of the components included in the vehicle electronic device 300 are not shown, and only some components are simplified and shown.

Hereinafter, a case where the user location detection method according to an embodiment of the disclosure is performed through at least one of the vehicle electronic device 300 or the mobile device 205 shown in FIG. 7 will be described as an example.

Figure 8:
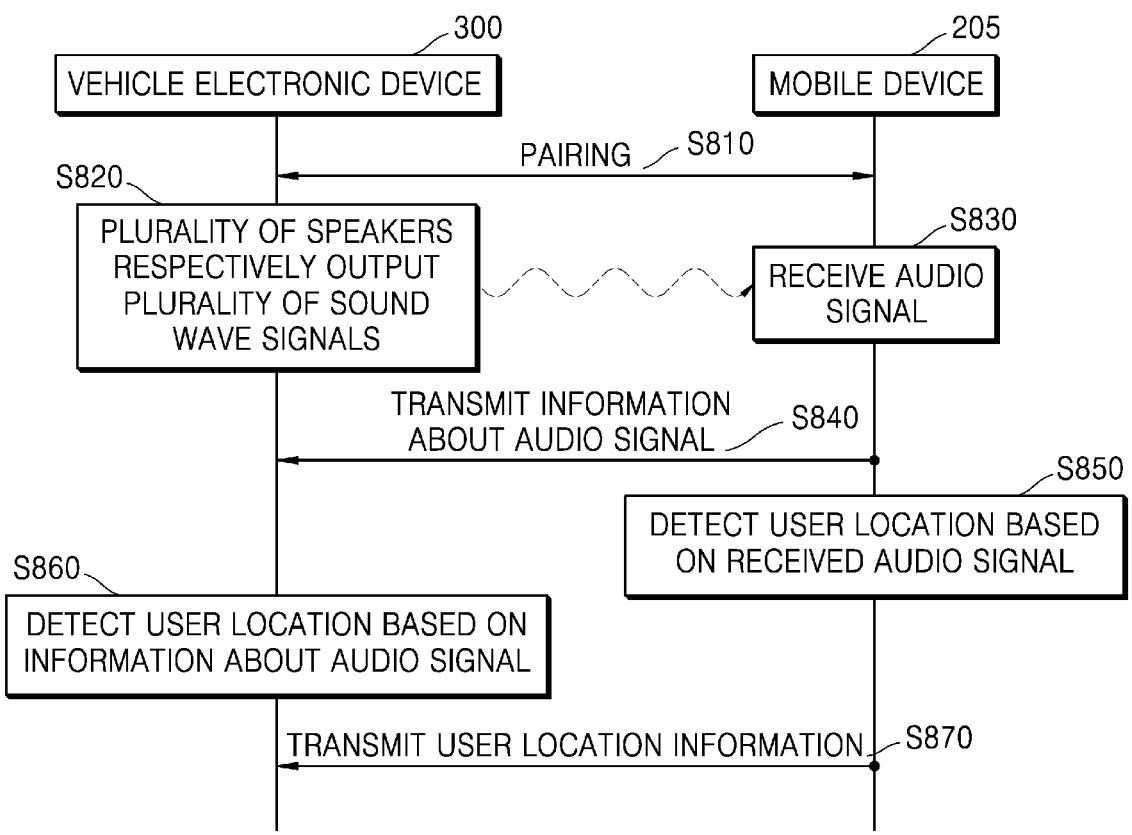
FIG. 8 is a diagram illustrating a user location detection method according to an embodiment of the disclosure.

FIG. 8 is a diagram illustrating a user location detection method according to an embodiment of the disclosure. For convenience of description, the components shown in FIG. 7 are referred to as an operating subject describing the operations shown in FIG. 8.

Referring to FIG. 8, a vehicle electronic device 300 may be connected to the mobile device 205 through a communication network. Specifically, the vehicle electronic device 300 may transmit/receive certain data with the mobile device 205 located adjacent thereto through a wireless communication network, may be paired with the mobile device 205 located adjacent thereto, may remotely control the mobile device 205 located adjacent thereto, and/or may be remotely controlled from the mobile device 205 located adjacent thereto.

Referring to FIG. 8, in order to detect the location of a user riding in a vehicle according to an embodiment of the disclosure, first, pairing between the vehicle electronic device 300 and the mobile device 205 may be performed (S810). Here, as a prerequisite for the mobile device 205 to receive the plurality of sound wave signals output from the vehicle electronic device 300, paring may mean an operation of performing communication between the vehicle electronic device 300 and the mobile device 205. Once pairing is completed, a plurality of sound wave signals output from the vehicle electronic device 300 may be received by and stored (or recorded) in the mobile device 205.

In addition, the mobile device 205 may transmit identification information of the mobile device 205 to the vehicle electronic device 300 in an operation of performing pairing. Accordingly, the vehicle electronic device 300 may even identify who is a user whose location is detected based on the identification information of the mobile device 205.

A pairing operation according to an embodiment of the disclosure will be described in detail with reference to FIGS. 10 and 11 below. Hereinafter, a case where the vehicle electronic device 300 and the mobile device 205 perform communication through the BLE communication network and are paired through the BLE communication network will be described as an example.

Here, the BLE network refers to a wireless network through which data or signals are transmitted and received using a BLE signal, and may be included in a Bluetooth communication network. Here, a BLE signal is a signal formed conforming to the BLE communication standard, and may have various forms such as a BLE packet, an iBeacon, etc.

In an embodiment of the disclosure, pairing may be performed by transmitting and receiving the BLE signal.

Figure 10:
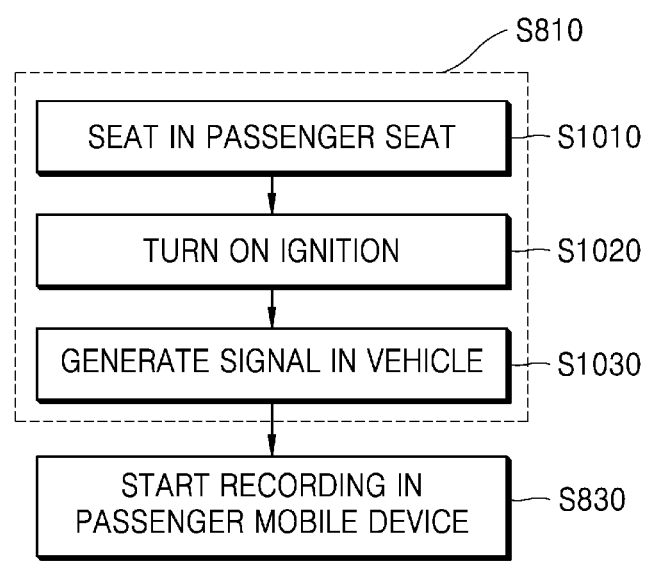
FIG. 10 is a diagram illustrating a pairing operation according to an embodiment of the disclosure.

FIG. 10 is a diagram illustrating a pairing operation in an embodiment of the disclosure.

Referring to FIG. 10, the pairing operation (S810) may be initiated by a request of a vehicle. For example, the pairing operation (S810) may be initiated by an event occurring in the vehicle or a request of the vehicle electronic device 300.

Specifically, the pairing operation (S810) may include transmitting a signal for triggering an audio signal to be recorded in the mobile device 205 in the vehicle electronic device 300. Specifically, the processor 210 may advertise a BLE signal requesting recording described above based on an event corresponding to a user of the mobile device 205 riding in the vehicle. Advertising the BLE signal is called 'BLE advertising'.

A case where a driver and a user A move using a vehicle is described as an example. Because the vehicle or the vehicle electronic device 300 does not know in which seat the user A sits, operations of detecting the user location may be performed according to the method according to an embodiment of the disclosure; as a prerequisite operation of detecting the user location, the pairing operation (S810) is performed.

For example, the user A of the mobile device 205 may sit in a passenger seat (S1010). Then, the driver of the vehicle will be able to turn on the ignition to drive the vehicle (S1020). Then, the vehicle, specifically, the vehicle electronic device 300, may perform and complete the pairing operation by generating a signal for pairing, for example, the BLE signal (S1030). Hereinafter, for convenience of description, pairing using the BLE signal will be referred to as 'BLE pairing'.

BLE pairing may refer to a pairing procedure between devices connectable through a BLE communication network.

BLE pairing may include pairing request and response. Specifically, the processor 210 of the vehicle electronic device 300 may control the communicator 230 to transmit a pairing request signal to the mobile device 205. Then, the mobile device 205 may transmit a response permitting pairing to the vehicle electronic device 300 in response to the request. For example, the signal requesting pairing may be a BLE signal such as a BLE packet or iBeacon. Here, the vehicle electronic device 300 'transmitting the BLE signal' or the 'transmitted BLE signal' itself may refer to as 'BLE Advertise', 'BLE Advertising' or 'BLE Advertisement'. That is, an operation S1030 shown in FIG. 10 may be a BLE Advertisement operation.

Specifically, the mobile device 205 may scan the BLE signal at all times or at regular intervals. Alternatively and/or additionally, the vehicle electronic device 300 may transmit the BLE signal to the mobile device 205, and the mobile device 205 may recognize the BLE signal transmitted through scanning and transmit the BLE signal to the vehicle electronic device 300 in response thereto. Here, the BLE signal may be formed in various forms such as a BLE packet, an iBeacon, etc. Accordingly, once the mobile device 205 receives a BLE signal, the mobile device 205 may receive all BLE signals having any one of various forms such as a BLE packet, an iBeacon, etc.

In addition, hereinafter, the operation of 'receiving a BLE signal' may include recognizing the BLE signal by scanning the BLE signal for a certain time period or a constant time. In addition, the operation of 'receiving a BLE signal' may include requesting reception of the BLE signal and receiving the BLE signal in response thereto.

In addition, the mobile device 205, which is a transmitting end, may be configured as an application equipped with a Bluetooth communication module (not shown) capable of transmitting a BLE signal and capable of setting a BLE advertisement. In addition, the pairing operation according to the transmission and reception of the BLE signal described in an embodiment of the disclosure may be a pairing operation conforming to the Bluetooth (BT) communication standard.

In an embodiment of the disclosure, the BLE signal requesting pairing may be a signal requesting the mobile device 205 to receive an audio signal and trigger a recording operation.

The pairing operation (S810) may be performed before outputting a plurality of sound wave signals from the audio output unit 220 of the vehicle electronic device 300. In addition, the pairing operation (S810) may be initiated by occurrence of an event and/or a request from at least one of a user of the vehicle or a user of the vehicle electronic device 300. For example, the event may occur in response to the occurrence of an operation for the user of the mobile device 205 riding in the vehicle, a preparation operation for driving the vehicle (e.g., an operation of turning on the ignition, stepping on the brake for driving, or changing a gear to driving gear for traveling, etc.), etc. In addition, when the user of the vehicle or the user of the vehicle electronic device 300 inputs a user input requesting detection of the user location, the pairing operation (S810) may be initiated.

That is, the event or user request described above may initiate the pairing operation (S810) to trigger the mobile device 205 to receive and record the audio signal.

When the pairing operation (S810) is completed, the mobile device 205 may receive and store (or record) the audio signal, and accordingly, recording may be started (S830).

Figure 11:
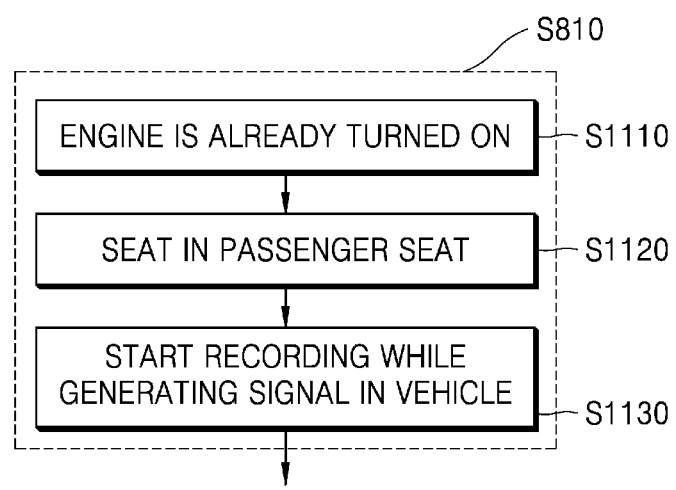
FIG. 11 is another diagram illustrating a pairing operation according to an embodiment of the disclosure.

FIG. 11 is another diagram illustrating a pairing operation in an embodiment of the disclosure.

Referring to FIG. 11, the pairing operation (S810) may be initiated by a request from the mobile device 205. For example, a pairing operation (S810) may be performed by receiving a signal requesting output of a plurality of sound wave signals from the mobile device 205 by the vehicle electronic device 300.

In the example shown in FIG. 11, the engine may be already turned on in the vehicle (S1110). The user A of the mobile device 205 may sit in a passenger seat in the vehicle where the engine is turned on (S1120). In response to a user input of the user A riding in the vehicle, the mobile device 205 may generate a BLE signal for pairing (S1130). That is, the processor 430 of the mobile device 205 may control the communicator 410 to transmit (e.g., advertise) the BLE signal requesting for the audio output unit 220 of the vehicle electronic device 300 to output sound wave signals in order to detect the user location (S1130).

Accordingly, once the communicator 230 of the vehicle electronic device 300 receives the transmitted BLE signal, the processor of the vehicle electronic device 300 may control a plurality of speakers included in the audio output unit 220 to respectively output a plurality of sound wave signals in correspondence to the reception of the BLE signal.

Also, the processor 430 of the mobile device 205 may control the audio input unit 420 to start recording of the audio signal after transmitting the BLE signal. Here, the BLE signal output from the mobile device 205 may be a BLE signal requesting for the audio output unit 220 of the vehicle electronic device 300 to output sound wave signals. Alternatively and/or additionally, once a response corresponding to the reception of the BLE signal is received by the mobile device 205 from the vehicle electronic device 300, the processor 430 of the mobile device 205 may control the audio input unit 420 to initiate recording of the audio signal.

Referring back to FIG. 8, when the pairing operation (S810) is completed, the processor 210 of the vehicle electronic device 300 may control the plurality of speakers included in the audio output unit 220 to respectively output a plurality of sound wave signals that are different in terms of at least one of a frequency band and a time period (S820). Here, the plurality of speakers included in the audio output unit 220 may refer to a plurality of speakers located in the vehicle and connectable to the vehicle electronic device 300 without being included in the vehicle electronic device 300. However, for convenience of description, in the accompanying drawings and detailed description, a case where a plurality of speakers located in the vehicle are included in the audio output unit 220 included in the vehicle electronic device 300 has been illustrated and described as an example.

The plurality of sound wave signals output in operation S820 will be described in detail with reference to FIGS. 12 to 18 below.

In an embodiment of the disclosure, each of the plurality of speakers included in the audio output unit 220 is a device that outputs a sound signal that may be visually recognized by a user, and may output a sound wave signal in an audible frequency band. Alternatively and/or additionally, each of the plurality of speakers included in the audio output unit 220 may output an ultrasound signal in which a frequency band higher than the audible frequency band is a sound wave signal in an ultrasound frequency band.

The audio output unit 220 includes a plurality of speakers. Each of the plurality of speakers may output an audio signal of an audible frequency band that may be audibly recognized by a user riding in the vehicle.

In an embodiment of the disclosure, the speakers included in the audio output unit 220 respectively outputs a plurality of sound wave signals corresponding to a plurality of frequency values under the control of the processor 210. Here, each of the plurality of sound wave signals may be an audio signal having a frequency value included in an output frequency band of the speaker. For example, when an ultrasound band is included in an output frequency band of a speaker, a sound wave signal output from the speaker may be a sound wave signal having an ultrasound frequency value.

The frequency band of the audio signal output from each of the plurality of speakers included in the audio output unit 220 will be described with reference to FIGS. 12 and 13 below.

Figure 12:
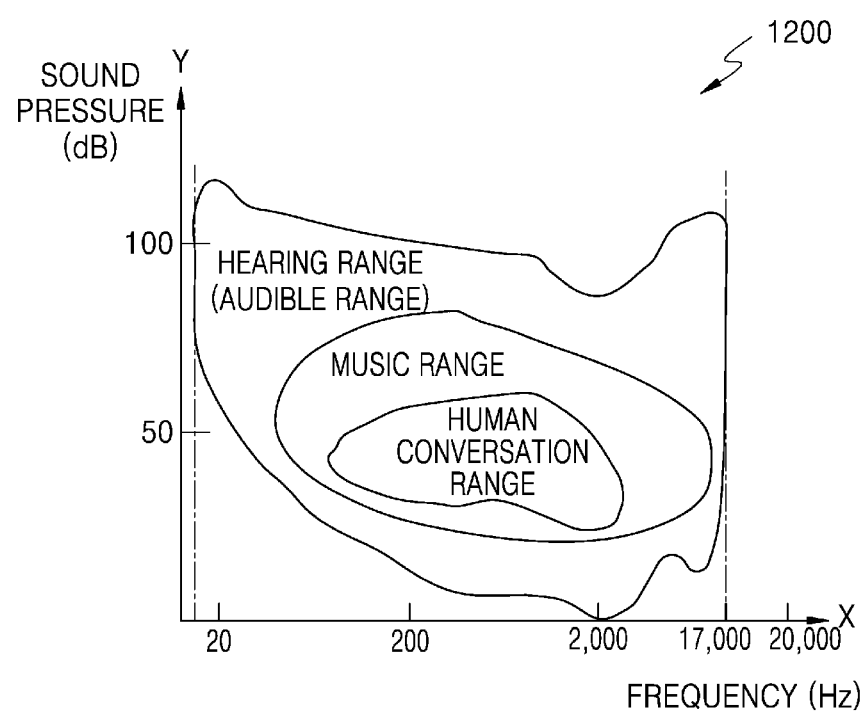
FIG. 12 is a diagram illustrating a sound wave signal used according to an embodiment of the disclosure.

FIG. 12 is a diagram illustrating a sound wave signal used in an embodiment of the disclosure.

Figure 13:
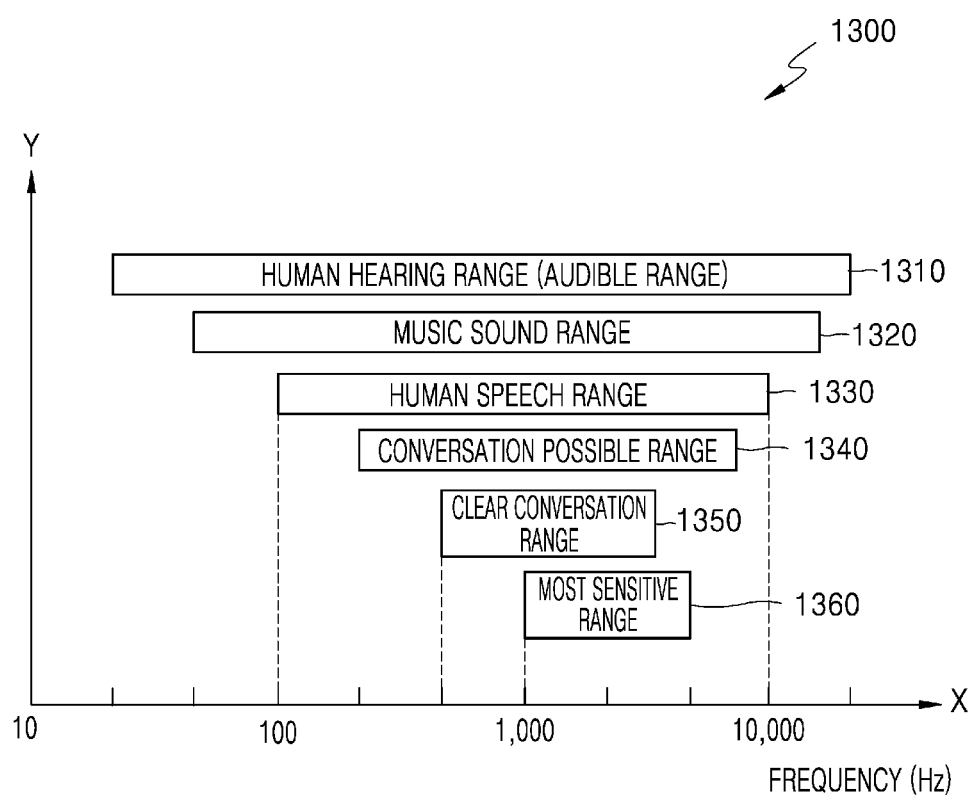
FIG. 13 is another diagram illustrating a sound wave signal used according to an embodiment of the disclosure.

FIG. 13 is another diagram illustrating a sound wave signal used in an embodiment of the disclosure.

In a graph 1200 of FIG. 12, the x-axis represents a frequency value, and the y-axis represents a sound pressure. The range of sound pressure may be decibels (dB), and the unit of frequency may be Hz. Referring to FIG. 12, an audible frequency band, which is a frequency band that includes a 'hearing range (audible range)' of humans, may be a frequency band of 20 Hz to 20 KHz. In general, the upper limit of the actual audible frequency band of a healthy adult may be 16 to 17 KHz. That is, the actual audible frequency band of the healthy adult may be 20 Hz to 17 KHz.

In a graph 1300 of FIG. 13, the x-axis represents a frequency value. In the graph 1300 of FIG. 13, frequency bands of a human hearing range (an audible range) 1310, a music sound range 1320, a human speech range 1330, a conversation possible range 1340, a range where conversation may be heard clearly 1350, and a most sensitive human sound range ('most sensitive range') 1360 are shown.

The processor 210 may set a frequency value of a sound wave signal in consideration of a human audible frequency band.

For example, the processor 210 may control the audio output unit 220 to output a sound wave signal belonging to a frequency range excluding the human hearing range (an audible range) 1310 in a frequency range of an audio signal that may be output by a speaker, based on a human audible frequency band. For example, it is assumed that the audible frequency band of a healthy adult is 20 Hz to 17 kHz, and the speaker included in the audio output unit 220 may output an audio signal of a frequency band of 20 to 20 kHz. Then, the processor 210 may control the audio output unit 220 to output a sound wave signal having a frequency value within a frequency range of 17 kHz to 20 kHz, which is a frequency band excluding the actual audible frequency band of a healthy adult, among frequency bands that may be output by a speaker.

As another example, for example, the processor 210 may control the audio output unit 220 to output a sound wave signal belonging to a frequency range excluding the most sensitive human sound range ('most sensitive range') 1360 in a frequency range of an audio signal that may be output by a speaker.

As described above, when the frequency value of the sound signal output from the speaker is set in consideration of the human audible frequency band or the most sensitive human sound range, the user or driver riding in the vehicle may not recognize the output of the sound signal. For example, when the speaker may output an audio signal of an ultrasound frequency band, the speaker may output a sound wave signal corresponding to the ultrasound frequency value. Then, the location of the user may be detected using a sound wave signal that may not be recognized by the user.

That is, the user location detection may be performed by setting a frequency value or range of the sound wave signal and outputting the sound wave signal so as not to cause inconvenience to the user or the driver due to the output of the sound signal.

Figure 14:
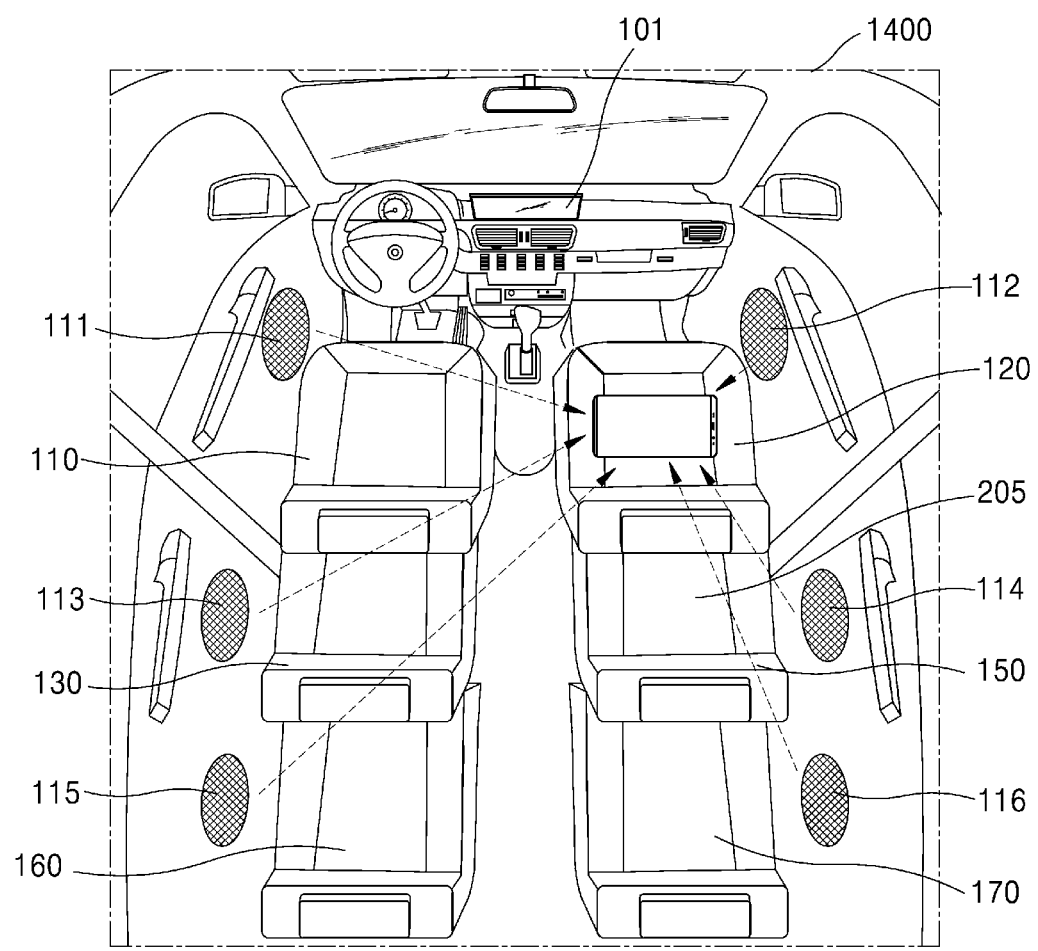
FIG. 14 is a diagram illustrating an example of a plurality of speakers located in a vehicle.

FIG. 14 is a diagram illustrating an example of a plurality of speakers located in a vehicle. In FIG. 14, the same components as those in FIG. 1 are illustrated by using the same reference numerals. Therefore, redundant descriptions with those described above will be omitted.

Referring to FIG. 14, a case where six speakers are included in a vehicle 1400 is illustrated as an example. For example, the audio output unit 220 may include first to sixth speakers 111, 112, 113, 114, 115, and 116. Specifically, the first speaker 111 may be disposed on the left side of a driver seat 110, the second speaker 112 may be disposed on the right side of a first seat 120, the third speaker 113 may be disposed on a second seat 130, the fourth speaker 114 may be disposed on the right side of a third seat 150, the fifth speaker 115 may be disposed on the left side of a fourth seat 160, and the sixth speaker 116 may be disposed on the right side of a fifth seat 170. That is, in FIG. 14, a case where a plurality of speakers included in the vehicle 1400 are disposed adjacent to a plurality of seats disposed in the vehicle 1400 in a 1:1 manner is shown as an example.

In an embodiment of the disclosure, sound wave signals output from the first to sixth speakers 111, 112, 113, 114, 115, and 116 may differ in at least one of a frequency band and a time period.

Referring back to FIG. 8, in response to the output of sound wave signals in operation S820, the mobile device 205 receives an audio signal (S830). Specifically, the audio input unit 420 of the mobile device 205 may receive an audio signal corresponding to a plurality of sound wave signals output from a plurality of speakers included in the audio output unit 220 of the vehicle electronic device 300.

For example, the mobile device 205 of the user may receive sound wave signals respectively output from the first to sixth speakers 111, 112, 113, 114, 115, and 116. Specifically, the mobile device 205 may receive an audio signal formed by sound wave signals respectively output from the first to sixth speakers 111, 112, 113, 114, 115, and 116.

Typically, a user riding in the vehicle 1400 is carrying his/her mobile device 205. Accordingly, the location of the mobile device 205 may be the location of the user. Accordingly, the location of the mobile device 205 may indicate the location of the user. Therefore, hereinafter, a case where the location of the mobile device 205 is the location of the user will be illustrated and described as an example.

In FIG. 14, a case where the mobile device 205 is located in a passenger seat is shown as an example.

Hereinafter, in an example in which six speakers are included in a vehicle as shown in FIG. 14, audio signals output respectively from speakers will be described in detail with reference to FIGS. 15 to 18.

Figure 15:
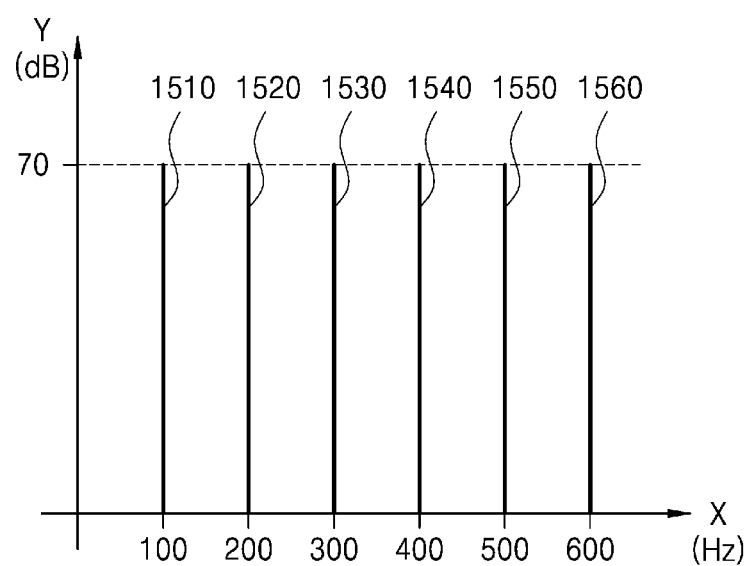
FIG. 15 is a diagram illustrating an example of a plurality of output sound wave signals according to an embodiment of the disclosure.

FIG. 15 is a diagram illustrating an example of a plurality of output sound wave signals according to an embodiment of the disclosure. In a graph shown in FIG. 15, the x-axis represents a frequency value in units of Hz, and the y-axis represents a level of sound pressure in units of dB.

In an embodiment of the disclosure, the processor 210 may control the audio output unit 220 so that a plurality of speakers respectively output a plurality of sound wave signals having different frequencies during the same time period. Specifically, operation S820 may include outputting a plurality of sound wave signals having different frequencies during the same time period.

Referring to FIG. 15, the plurality of speakers 111, 112, 113, 114, 115, and 116 illustrated in FIG. 14 respectively output a plurality of sound wave signals 1510, 1520, 1530, 1540, 1550, and 1560 having the same magnitude (sound pressure or amplitude) and having different frequency values. In FIG. 15, for convenience of description, a case where sound wave signals each having a frequency value of 100 Hz to 600 Hz are output is shown as an example.

For example, the first speaker 111 may output the sound wave signal 1510 having a magnitude of 70 dB and having a first frequency value, for example, a frequency of 100 Hz, and the second speaker 112 may output the sound wave signal 1520 having a magnitude of 70 dB and having a second frequency value, for example, a frequency of 200 Hz. Also, the third speaker 113 may output the sound wave signal 1530 having a magnitude of 70 dB and having a frequency of a third frequency value, for example, a frequency of 300 Hz, and the fourth speaker 114 may output the sound wave signal 1530 having a magnitude of 70 dB and having a frequency of a fourth frequency value, for example, a frequency of 400 Hz. In addition, the fifth speaker 115 may output the sound wave signal 1550 having a magnitude of 70 dB and having a fifth frequency value, for example, a frequency of 500 Hz, and the sixth speaker 116 may output the sound wave signal 1550 having a magnitude of 70 dB and having a sixth frequency value, for example, 600 Hz.

Referring back to FIG. 8, the mobile device 205 may receive an audio signal corresponding to the plurality of sound wave signals illustrated in FIG. 15 (S830). An example of the audio signal received by the mobile device 205 will be described with reference to FIG. 16 below.

Figure 16:
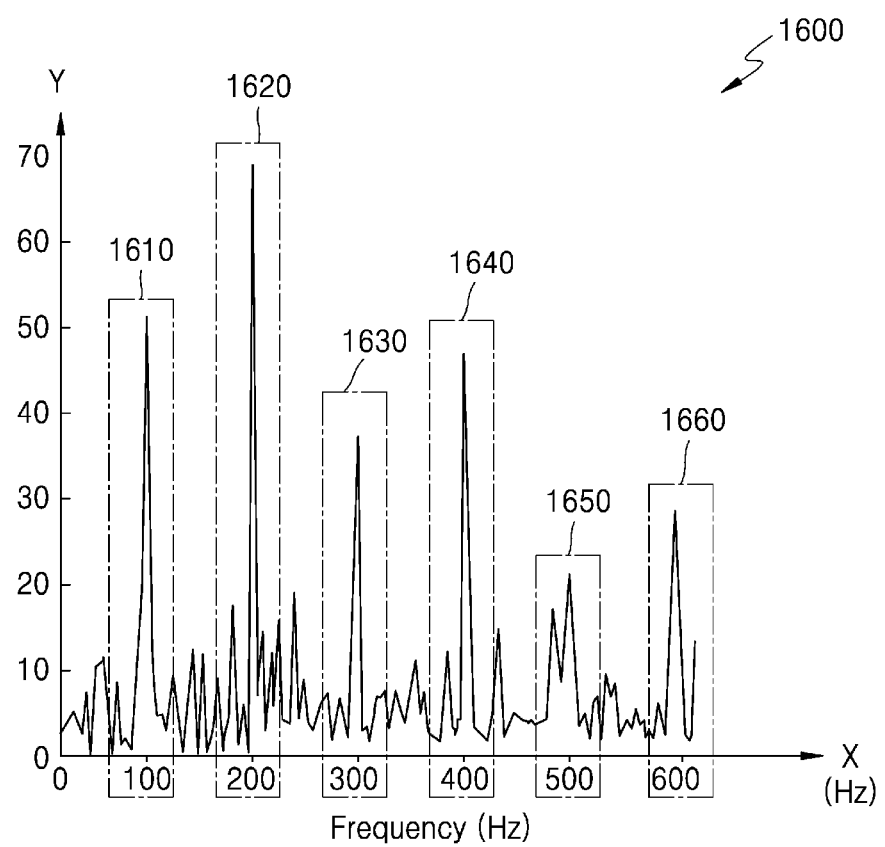
FIG. 16 is a diagram illustrating another example of a plurality of output sound wave signals according to an embodiment of the disclosure.

FIG. 16 is a diagram illustrating another example of a plurality of output sound wave signals according to an embodiment of the disclosure. FIG. 16 illustrates an example of an audio signal 1600 received by the mobile device 205 corresponding to the output of the sound wave signals illustrated in FIG. 15.

Referring to FIG. 16, when the plurality of speakers 111, 112, 113, 114, 115, and 116 in a vehicle respectively output the plurality of sound wave signals 1510, 1520, 1530, 1540, 1550, and 1560, the mobile device 205 may receive the audio signal 1600.

In an embodiment of the disclosure, the location of a user may be identified based on an audio signal received by the mobile device 205. That is, information representing the location of the user may be obtained based on the audio signal received by the mobile device 205.

In addition, an analysis operation of an audio signal required to obtain the information representing the location of the user may be performed by the mobile device 205 or the vehicle electronic device 300. Referring back to FIG. 8, operation S850 indicates a case where the information representing the location of the user is obtained from the mobile device 205, and operation S860 indicates a case where the information representing the location of the user is obtained from the vehicle electronic device 300.

Specifically, the information representing the location of the user may be obtained based on at least one of a signal strength or a reception time of at least one audio component corresponding to at least one frequency value included in the audio signal received by the mobile device 205. Here, the signal strength of the audio component may indicate a sound pressure, amplitude, output gain, etc., of the audio component. Also, the audio component may be a part of an audio signal having a signal strength equal to or greater than a threshold value and corresponding to a certain frequency value. Here, the threshold value may mean a reference value for distinguishing an audio signal output from a speaker and noise.

Specifically, the information representing the location of the user may be obtained based on the signal strength of the at least one audio component corresponding to the at least one frequency value included in the audio signal received by the mobile device 205. Alternatively and/or additionally, the information representing the location of the user may be obtained based on the signal strength and the reception time of the at least one audio component corresponding to the at least one frequency value included in the audio signal received by the mobile device 205.

Specifically, the mobile device 205 may obtain the information about the location of the user based on the received audio signal (S850).

Obtaining the location information based on the received audio signal will be described in detail below.

In an embodiment of the disclosure, before operation S850 is performed, the mobile device 205 may obtain output information about a plurality of sound wave signals output in operation S820 (operation not shown). Here, the output information may include information about at least one of frequency values, signal strengths, and output times of a plurality of sound wave signals to be output (or output) respectively from a plurality of speakers disposed in the vehicle. In addition, obtaining the output information may be performed before operation S850. In addition, the output information may be transmitted through the communicator 230 under the control of the processor 210 of the vehicle electronic device 300, and accordingly, the communicator 410 of the mobile device 205 may receive the output information and transmit the output information to the processor 430.

For example, the mobile device 205 may obtain the output information when the vehicle electronic device 300 performs the pairing operation S810. As another example, the mobile device 205 may receive the output information from the vehicle electronic device 300 immediately after receiving the audio signal (S830).

Further, in operation S850, based on the received audio signal and the output information, a seat in which the user is located may be identified from among a plurality of seats arranged in the vehicle.

Specifically, operation S850 includes filtering at least one audio component corresponding to at least one frequency band in the audio signal received by the mobile device 205; identifying at least one speaker corresponding to the at least one filtered audio component; and identifying a seat in the vehicle where the mobile device 205 is located, based on the location of the identified at least one speaker. Operation S850 may be performed by the processor 430 of the mobile device 205. According to one or more embodiments, in order to identify a speaker nearest to the mobile device 205 such that the seat of the user is identified, the mobile device 205 can receive an association of each speaker 111, 112, 113, 114, 115, and 116 to its respective audio component having at least one frequency value.

For example, the mobile device 205 may receive the audio signal 1600 and filter noise components by filtering the received audio signal. Specifically, the processor 430 of the mobile device 205 may extract audio components corresponding to a frequency component included in the audio signal 1600. For example, the audio signal 1600 may include an audio component 1610 corresponding to a frequency component of 100 Hz, an audio component 1620 corresponding to a frequency component of 200 Hz, an audio component 1630 corresponding to a frequency component of 300 Hz, an audio component 1640 corresponding to a frequency component of 400 Hz, and an audio component 1650 corresponding to a frequency component of 500 Hz.

The processor 430 may detect the location of the user, based on a component having the greatest signal strength among the plurality of audio components 1610, 1620, 1630, 1640, 1650, and 1660 corresponding to a plurality of frequency values included in the audio signal 1600. When a plurality of speakers in the vehicle output sound wave signals having the same sound pressure (or intensity), the audio component having the greatest intensity in the audio signal received by the mobile device 205 may correspond to a sound wave signal output from a speaker located closest to the mobile device 205. Therefore, the processor 430 may detect the location of the user by filtering the audio component having the greatest signal strength in the audio signal received by the mobile device 205, and identifying a speaker outputting a sound wave signal corresponding to the filtered audio component.

In the examples shown and described in FIGS. 14 to 16, the frequency value of the audio component 1620 having the greatest signal strength among the audio components 1610, 1620, 1630, 1640, 1650, and 1660 included in the audio signal 1600 received by the mobile device 205 is 200 Hz, which is the same as the frequency value of the sound wave signal 1520 output from the second speaker 112. In this case, the processor 430 may identify the location of the mobile device 205 as the location of a passenger seat, which is the closest seat to the second speaker 112, based on the audio signal 1600.

Figure 17:
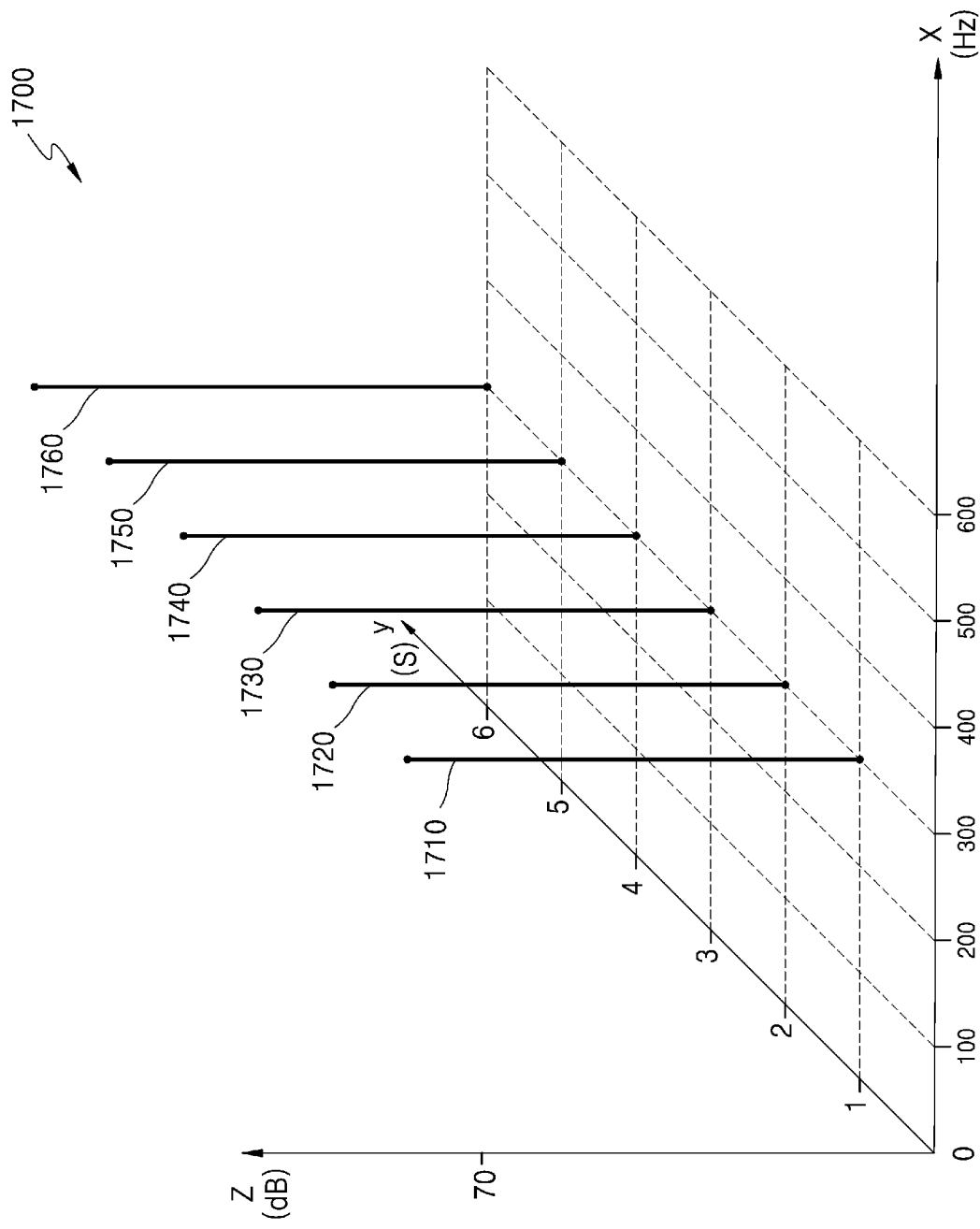
FIG. 17 is a diagram illustrating another example of a plurality of output sound wave signals according to an embodiment of the disclosure.

FIG. 17 is a diagram illustrating another example of a plurality of output sound wave signals according to an embodiment of the disclosure.

In an embodiment of the disclosure, the plurality of speakers may respectively output a plurality of sound wave signals having the same frequency at a plurality of different points in time. Specifically, the plurality of speakers may sequentially and respectively output sound wave signals having the same frequency at a certain time period. In this case, the plurality of sound wave signals may be the same or different in the signal intensity.

Referring to the examples shown in FIGS. 14 and 17 described above, the plurality of speakers may sequentially and respectively output a plurality of sound wave signals having the same frequency and the same signal strength (or sound pressure) at a period of 1 second. In FIG. 17, a case where the frequency value of the sound wave signals is 300 Hz and the strength of the sound wave signal is 70 dB is illustrated as an example.

Referring to FIG. 17, the x-axis represents a frequency value, the y-axis represents a time axis with respect to a reference point (point 0) at which an output of a sound wave signal is initiated, and the z-axis represents the intensity of an audio signal.

For example, the first speaker 111 may output a sound wave signal 1710 having a magnitude of 70 dB and a frequency of 300 Hz at a point of 1 second, and the second speaker 112 may output a sound wave signal 1720 having a magnitude of 70 dB and a frequency of 300 Hz at a period of 2 seconds. The third speaker 113 may output a sound wave signal 1730 having a magnitude of 70 dB and a frequency of 300 Hz at a period of 3 seconds, and the fourth speaker 114 may output a sound wave signal 1740 having a magnitude of 70 dB and a frequency of 300 Hz at a period of 4 seconds. In addition, the fifth speaker 115 may output a sound wave signal 1750 having a magnitude of 70 dB and a frequency of 300 Hz at a point of 5 seconds, and the sixth speaker 116 may output the sound wave signal 1710 having a magnitude of 70 dB and a frequency of 300 Hz at a point of 6 seconds.

In the example described above, the processor 430 may detect the location of the mobile device 205 based on the audio signal received by the audio input unit 420 in correspondence to the output of the sound wave signals 1710, 1720, 1730, 1740, 1750, and 1760. Specifically, the processor 430 may detect the location of the mobile device 205, which is the location of the user, based on the signal strength and reception time of each of the plurality of audio components included in the received audio signal.

A case where the sound wave signals 1710, 1720, 1730, 1740, 1750, and 1760 illustrated in FIG. 17 are respectively output from the plurality of speakers (e.g., 111, 112, 113, 114, 115, and 116 in FIG. 14) located in the vehicle is described as an example. The processor 430 may detect the location of the user based on a component having the greatest signal strength among audio components included in the received audio signal. Specifically, when a plurality of speakers in the vehicle output sound wave signals having the same sound pressure (or intensity), an audio component having the greatest intensity in the audio signal received by the mobile device 205 may correspond to a sound wave signal output from the nearest speaker. Accordingly, the processor 430 may filter the audio component having the greatest intensity in the audio signal received by the mobile device 205, and identify a time period in which the filtered audio component is detected. Then, if a speaker outputting a sound wave signal is identified in the time period in which the filtered audio component is detected, the location of the user may be detected.

For example, when an audio component having the greatest signal strength is detected between 2 seconds and 3 seconds, the audio component may correspond to the sound wave signal 1720 output from the second speaker 112 at 2 seconds. Accordingly, the processor 430 may determine that the location of the mobile device 205, which is the location of the user, is the passenger seat 120, which is the closest location to the second speaker 112.

Figure 18:
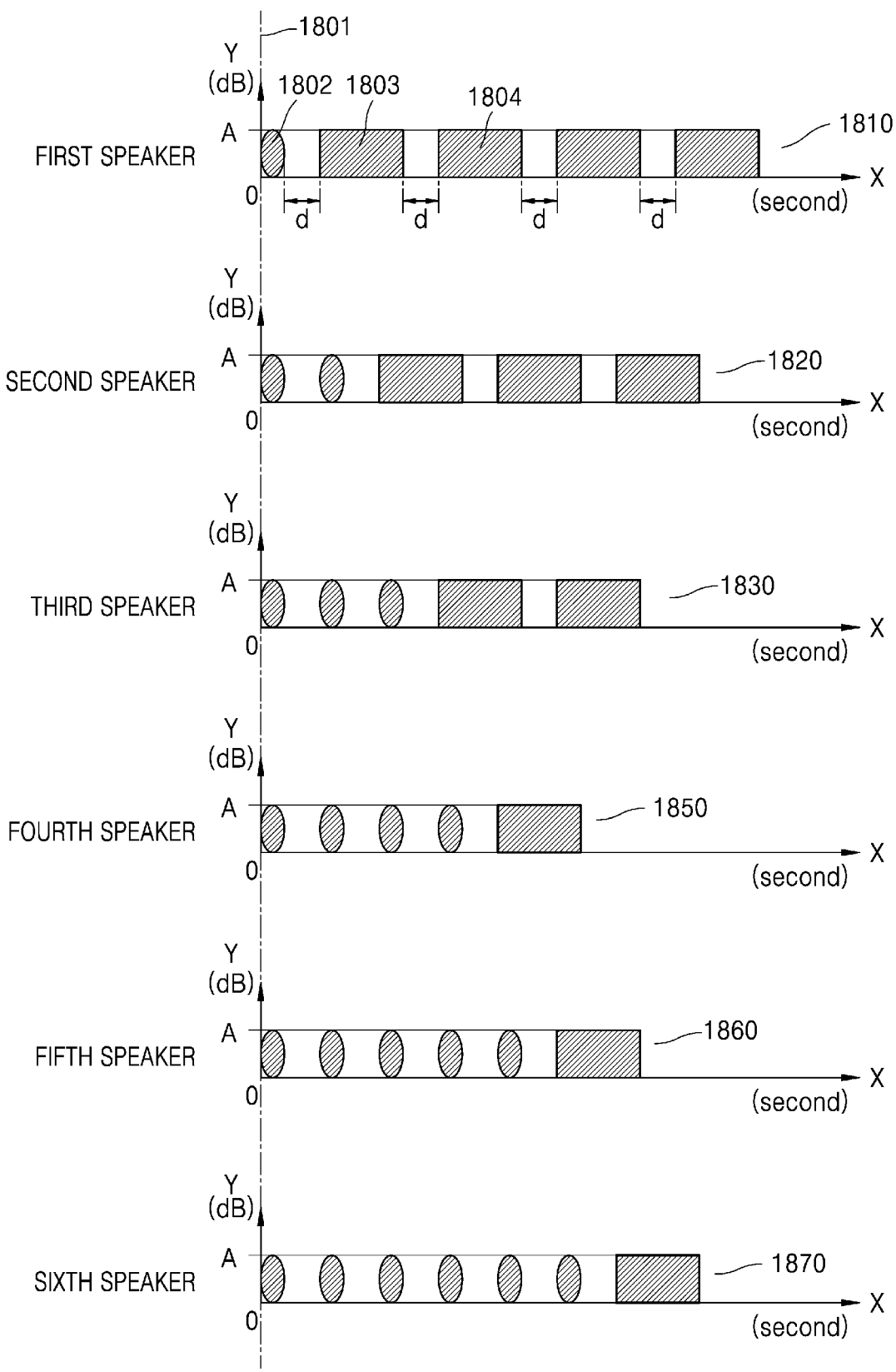
FIG. 18 is a diagram illustrating another example of a plurality of output sound wave signals according to an embodiment of the disclosure.

FIG. 18 is a diagram illustrating another example of a plurality of output sound wave signals according to an embodiment of the disclosure.

In an embodiment of the disclosure, the plurality of speakers may respectively output sound wave signals having different sound wave patterns. Here, different sound wave patterns may be audio signals of the same frequency band. Alternatively, different sound wave patterns may be audio signals of different frequency bands. Also, sounds included in the sound wave patterns may have the same signal strength.

Referring to the examples shown in FIGS. 14 and 18 described above, a first sound wave pattern 1810 is a sound wave pattern output from the first speaker 111, a second sound wave pattern 1820 is a sound wave pattern output from the second speaker 112, and a third sound wave pattern 1830 is a sound wave pattern output from the third speaker 113. In addition, a fourth sound wave pattern 1850 is a sound wave pattern output from the fourth speaker 114, a fifth sound wave pattern 1860 is a sound wave pattern output from the fifth speaker 115, and a sixth sound wave pattern 1870 is a sound wave pattern output from the sixth speaker 116. In addition, the plurality of sound wave patterns may be respectively output from the plurality of speakers 111, 112, 113, 114, 115, and 116 at a same reference time point 1801. In FIG. 18, a case where sounds included in the sound wave patterns have the same signal intensity of A dB is illustrated as an example. Here, the sound wave patterns may be repeatedly generated in a similar method to the principle of Morse code.

Referring to the first sound wave pattern 1810, black hatched patterns of sounds 1802, 1803, and 1804 are time periods in which sound is output, and an in between period 'd' is a time period in which no sound is output. In addition, the sound 1802 indicated by an ellipse may indicate a sound output for 0.5 seconds, and the sounds 1803 and 1804 indicated by rectangles may indicate sounds output for 1.5 seconds. In addition, the in between period 'd' in which no sound is output may all have the same time value. For example, the sound 1802 may be output for 0.5 seconds, then no sound may be output for the in between period d=0.5 seconds; subsequently the sound 1803 may be output for 1.5 seconds, subsequently no sound may be output for the in between period d=0.5 seconds, and subsequently, the sound 1804 may be output for 1.5 seconds.

As illustrated in FIG. 18, the plurality of speakers 111, 112, 113, 114, 115, and 116 may repeatedly generate different specific sound wave patterns, and the processor 430 may analyze a sound wave pattern by receiving only a signal having an intensity equal to or higher than a threshold value from the audio signal received by the audio input unit 420. In addition, the processor 430 may detect the location of the mobile device 205, which is the location of the user, by determining a speaker that outputs a sound wave pattern equal to or greater than the threshold value.

The location information of the user obtained in operation S850 may be transmitted to the vehicle electronic device 300 (S870). Specifically, the communicator 410 may transmit the location information of the user to the communicator 230 of the vehicle electronic device 300 under the control of the processor 430 (S870).

In the above, with reference to FIGS. 8 to 18, operations of obtaining the location information of the user in the vehicle based on the audio signal received by the mobile device 205 have been described in detail.

Referring back to FIG. 8, the location information of the user may be obtained from the vehicle electronic device 300.

Specifically, referring to FIGS. 7 and 8, once an audio signal is received from the audio input unit 420 of the mobile device 205 (S830), the communicator 410 may transmit information about the audio signal received under the control of the processor 430 to the communicator 230 of the vehicle electronic device 300 (S840). Here, the information about the audio signal transmitted in operation S840 may be the audio signal itself received by the audio input unit 420. Alternatively and/or additionally, the information about the audio signal transmitted in operation S840 may include information about the reception time and the signal strength of at least one audio component included in the audio signal received by the audio input unit 420.

The processor 210 of the vehicle electronic device 300 may detect the user location based on the information received in operation S840 (S860). An operation of detecting the user location based on the received information about the audio signal is the same as operation S850 described above, and thus, a detailed description thereof will be omitted.

Also, there may be cases where speakers disposed in a vehicle do not have a 1:1 relationship with seats. For example, there may be a case where the number of speakers is smaller than the number of seats in a vehicle, or a case where a speaker adjacent to a seat in a vehicle does not have a 1:1 relationship with the seat. In this case, the location of the seat may be detected using a ratio of the intensity of the sound wave signal. Hereinafter, this will be described in detail with reference to FIGS. 19A to 20C.

Figure 19A:
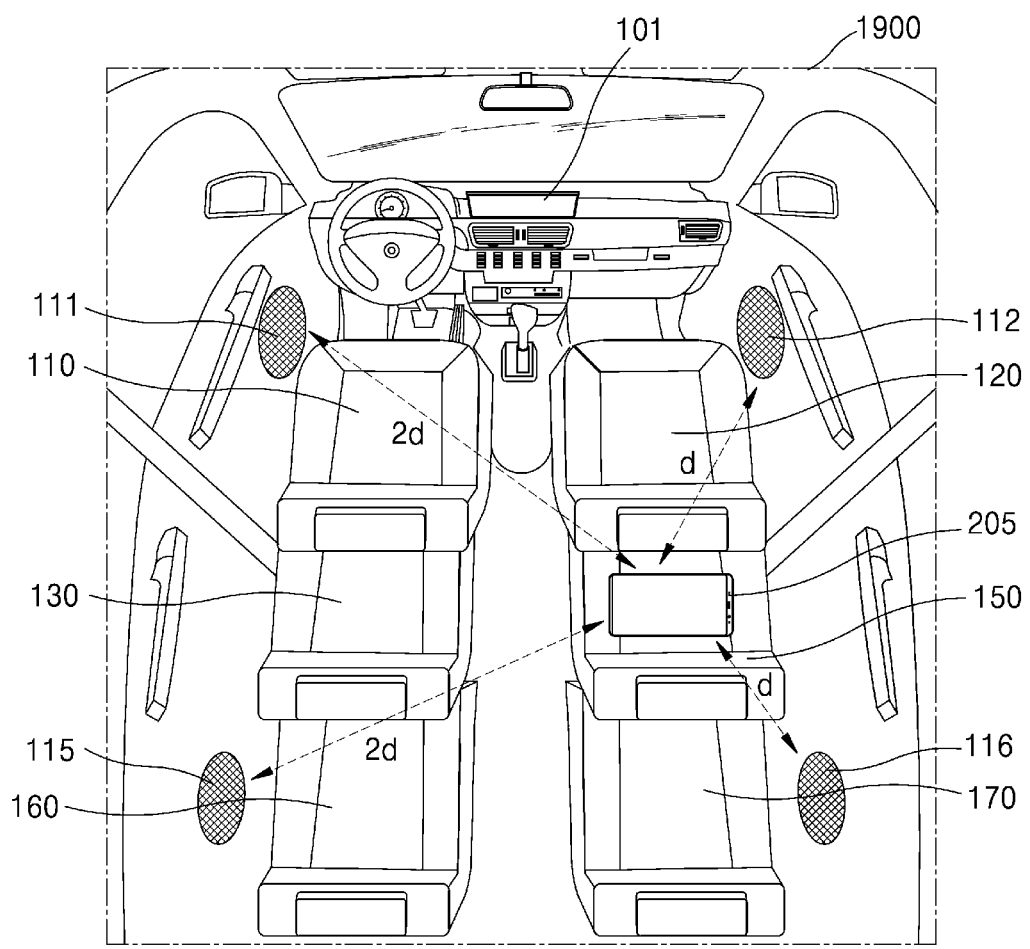
FIG. 19A is a diagram illustrating another example of a plurality of speakers located in a vehicle.

FIG. 19A is a diagram illustrating another example of a plurality of speakers located in a vehicle. In FIG. 19A, the same components as those in FIG. 14 are illustrated by using the same reference numerals.

Figure 19B:
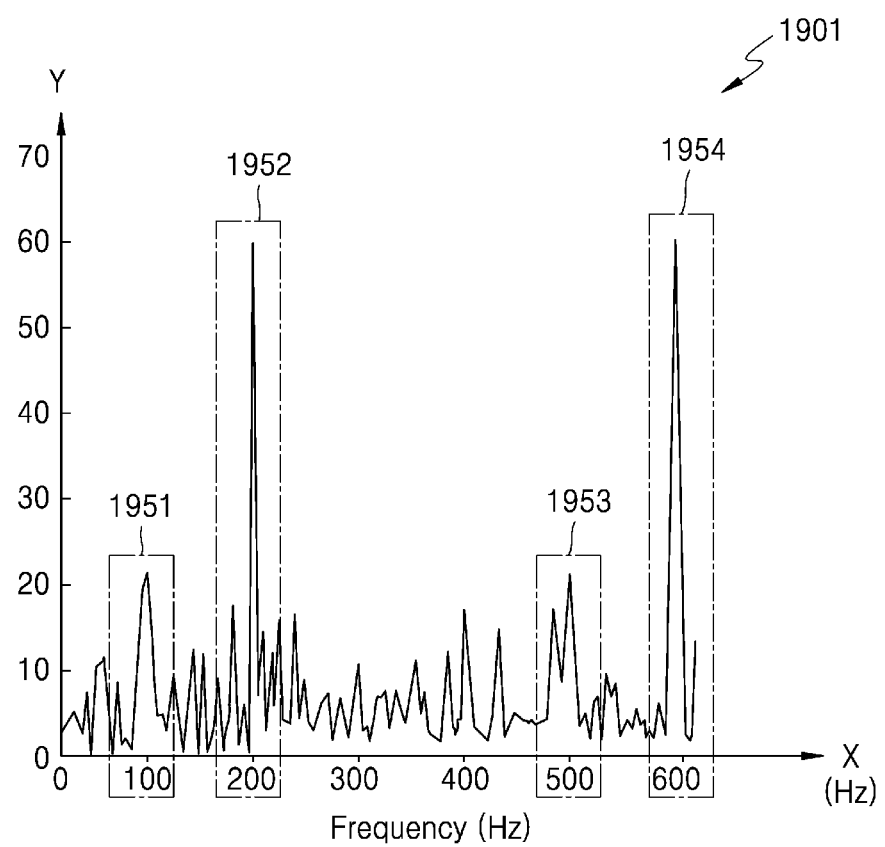
FIG. 19B is a diagram illustrating an example of an audio signal received by a mobile device.

FIG. 19B is a diagram illustrating an example of an audio signal received by a mobile device.

Referring to FIG. 19A, a case where four speakers are included in a vehicle 1900 is illustrated as an example. For example, the audio output unit 220 may include the four speakers 111, 112, 115, and 116. Specifically, the first speaker 111 may be disposed on the left side of the driver seat 110, the second speaker 112 may be disposed on the right side of the first seat 120, the fifth speaker 115 may be disposed on the fourth seat 160, and the sixth speaker 116 may be disposed on the right side of the fifth seat 170. That is, in the example shown in FIG. 19A, the number of speakers included in the vehicle 1900 is less than the number of seats in the vehicle 1900.

For example, the four speakers 111, 112, 113, and 114 included in the vehicle 1900 may respectively output sound wave signals described in FIG. 15, 17, or 18. For example, the four speakers 111, 112, 1113, and 114 included in the vehicle 1900 may respectively output the plurality of sound wave signals 1510, 1520, 1550, and 1560 having the same magnitude (sound pressure or amplitude) and having different frequency values described in 15.

For example, the first speaker 111 may output the sound wave signal 1510 having a magnitude of 70 dB and having a first frequency value, for example, a frequency of 100 Hz, and the second speaker 112 may output the sound wave signal 1520 having a magnitude of 70 dB and having a second frequency value, for example, a frequency of 200 Hz Also, the fifth speaker 115 may output the sound wave signal 1550 having a magnitude of 70 dB and having a fifth frequency value, for example, a frequency of 500 Hz, and the sixth speaker 116 may output the sound wave signal 1560 having a magnitude of 70 dB and having a sixth frequency value, for example, a frequency of 600 Hz. In this case, the audio signal received by the mobile device 205 may be the audio signal 1901 shown in FIG. 19B.

For example, as shown in FIG. 19B, the audio signal 1901 received by the audio input unit 420 may include an audio component 1951 corresponding to a frequency value of 100 Hz, an audio component 1952 corresponding to a frequency value of 200 Hz, an audio component 1953 corresponding to a frequency value of 500 Hz, and an audio component 1954 corresponding to a frequency value of 600 Hz. Specifically, the audio input unit 420 may extract only audio components determined not to be noise through noise filtering, and the extracted audio components may include the audio component 1951, the audio component 1952, the audio component 1953, and the audio component 1954.

As in the example of FIG. 19A, when the number of speakers in the vehicle 1900 is less than the number of seats, the location information of the user may be detected based on the signal strength of each of the audio components included in the audio signal received by the audio input unit 420. Specifically, the intensity of sound is inversely proportional to the square of a distance. Therefore, when the signal strength of each of the audio components is known, the location of the mobile device 205 may be identified based on a ratio of the signal strength of each of the audio components.

Referring to FIG. 19A, a case where a ratio of the signal strength between the audio component 1951 corresponding to a sound wave signal output from the speaker 111 disposed close to the driver seat 110 and the audio component 1953 corresponding to a sound wave signal output from the speaker 115 disposed close to the fourth seat 160 is 1, and a ratio of the signal strength between the audio component 1952 corresponding to a sound wave signal output from the speaker 112 disposed close to the first seat 120, which is a passenger seat, and the audio component 1954 corresponding to a sound wave signal output from the speaker 116 disposed close to the fifth seat 170 is 4 is described as an example. In this case, based on the ratio of the signal strength of the audio components included in the audio signal 1901, the location of the user may be recognized to be a relative distance of 1 away from each of the speaker 112 disposed close to the first seat 120, which is the passenger seat, and the speaker 116 disposed close to the fifth seat 170, and a relative distance of 2 away from each of the speaker 111 disposed close to the driver seat 110 and the speaker 115 disposed close to the fourth seat 160. As a result, the location of the mobile device 205, which is the location of the user, may be determined to be the location of the third seat 150 as shown in FIG. 19A.

Also, the processor 430 may obtain map information of the locations of speakers and seats disposed in the vehicle 1900. Here, the map information may include information about an absolute distance between each of speakers and each of seats disposed in the vehicle. Also, the location of the mobile device 205 may be identified based on the map information and signal strengths of audio components included in the audio signal 1901. Specifically, the intensity of sound is inversely proportional to the square of the distance. Therefore, the processor 430 may estimate the location of the mobile device 205 from the speaker when the degree to which the signal strengths of the audio components included in the audio signal 1901 are reduced compared to the signal strength output from the speaker is known. Accordingly, the processor 430 may obtain the information about the location of the mobile device 205 based on a reduction rate of the sound wave signal output from the speaker.

Figure 20A:
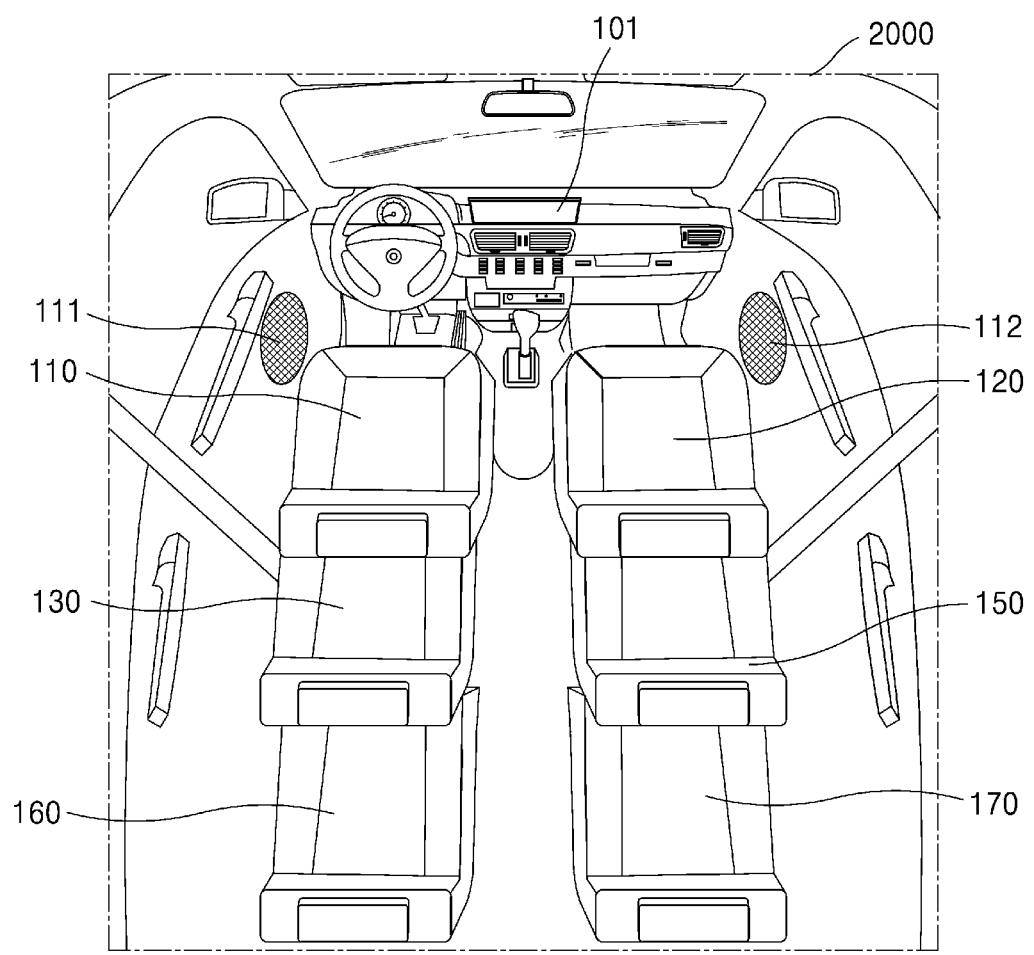
FIG. 20A is a diagram illustrating another example of a plurality of speakers located in a vehicle.

FIG. 20A is a diagram illustrating another example of a plurality of speakers located in a vehicle. In FIG. 20A, the same components as those in FIG. 14 are illustrated by using the same reference numerals.

Figure 20B:
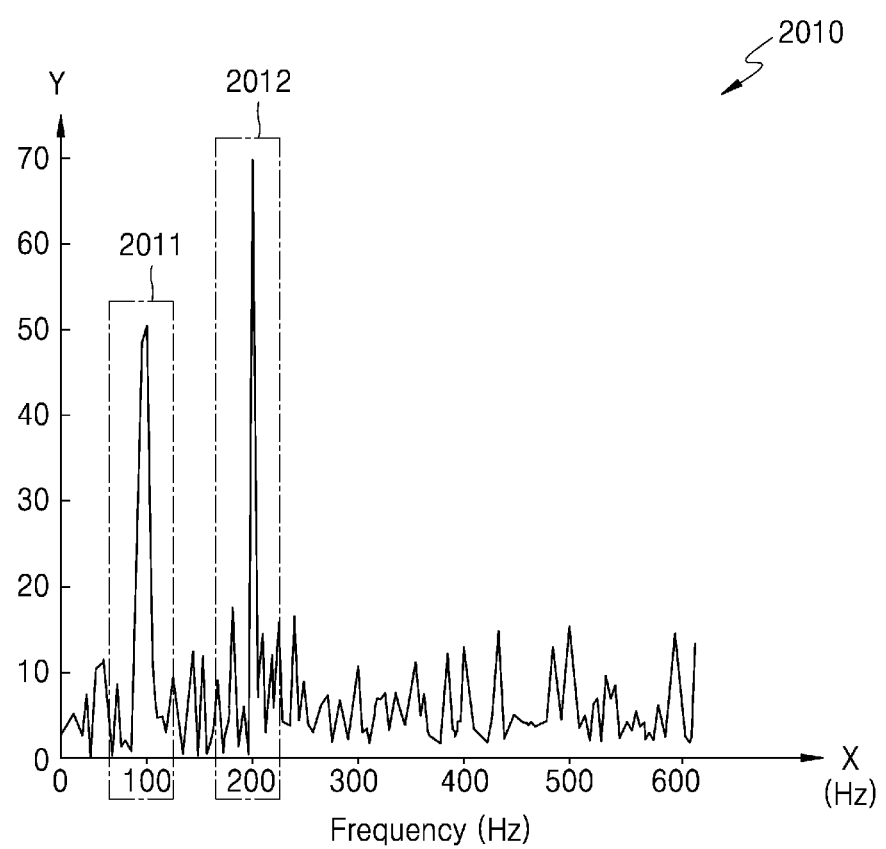
FIG. 20B is a diagram illustrating another example of an audio signal received by a mobile device.
Figure 20C:
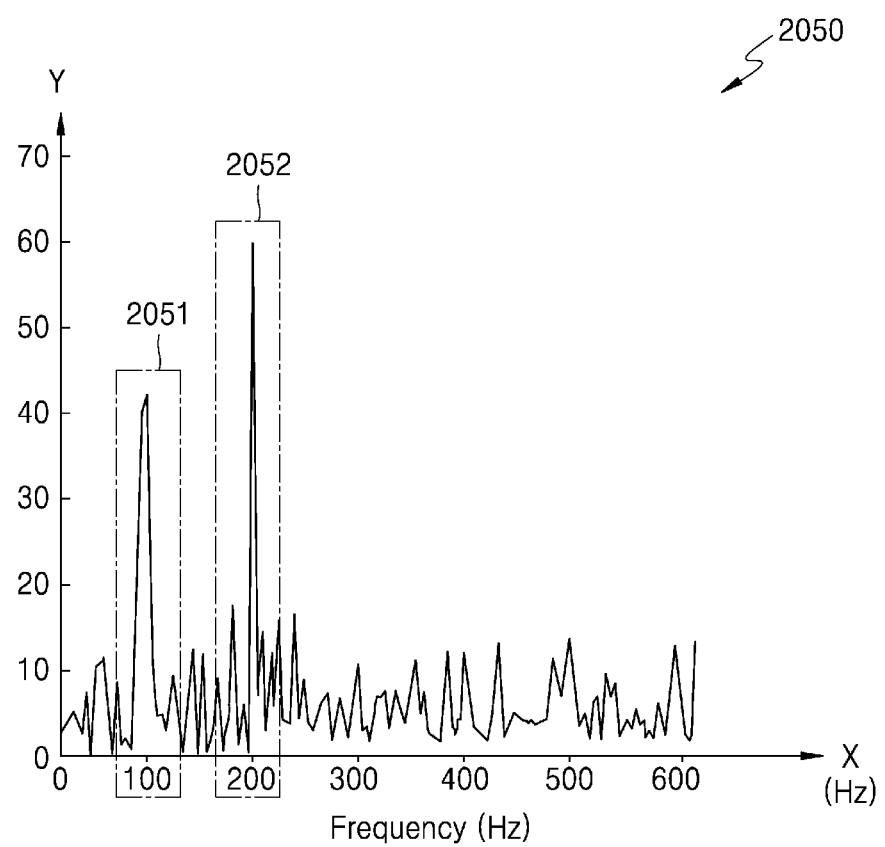
FIG. 20C is a diagram illustrating another example of an audio signal received by a mobile device.

FIG. 20B is a diagram illustrating an example of an audio signal received by a mobile device. FIG. 20C is a diagram illustrating another example of an audio signal received by a mobile device.

Referring to FIG. 20A, a case where two speakers are included in a vehicle 2000 is illustrated as an example. For example, the audio output unit 220 may include the two speakers 111 and 112. Specifically, the first speaker 111 may be disposed on the left side of the driver seat 110, and the second speaker 112 may be disposed on the right side of the first seat 120. That is, in the example shown in FIG. 20A, the number of speakers included in the vehicle 1900 is smaller than the number of seats in the vehicle 1900.

For example, the two speakers 111 and 112 included in the vehicle 2000 may respectively output the sound wave signals described in FIG. 15, 17, or 18. For example, the two speakers 111 and 112 included in the vehicle 2000 may respectively output the plurality of sound wave signals 1510 and 1520 having the same magnitude (sound pressure or amplitude) and having different frequency values described in FIG.

For example, the first speaker 111 may output the sound wave signal 1510 having a magnitude of 70 dB and having a first frequency value, for example, a frequency of 100 Hz, and the second speaker 112 may output the sound wave signal 1520 having a magnitude of 70 dB and having a second frequency value, for example, 200 Hz. In this case, examples of audio signals received by the mobile device 205 are described in detail in FIGS. 20B and 20C.

As in the example of FIG. 20A, when the number of speakers in the vehicle 2000 is less than the number of seats, the location information of the user may be detected based on the signal strength of each of the audio components included in the audio signal received by the audio input unit 420. Specifically, the intensity of sound is inversely proportional to the square of the distance. Therefore, when it is known how much the signal strength of each of the audio components included in the received audio signal is reduced compared to the signal strength output from the speaker, the location of the mobile device 205 may be estimated from the speaker. Accordingly, information about the location of the mobile device 205 may be obtained based on the reduction rate of the sound wave signal output from the speaker.

Referring to FIG. 20B, an audio signal 2010 received by the audio input unit 420 may include an audio component 2011 corresponding to a frequency value of 100 Hz and an audio component 2012 corresponding to a frequency value of 200 Hz. Here, because the audio component 2011 has a frequency value of 100 Hz, the audio component 2011 corresponds to the sound wave signal output from the first speaker 111, and because the audio component 2012 has a frequency value of 200 Hz, the audio component 2012 corresponds to the sound wave signal output from the second speaker 112. As described in FIG. 15, the first speaker 111 and the second speaker 112 respectively output sound wave signals having a signal strength of 70 dB. Therefore, the signal strength of the sound wave signal output from each of the first speaker 111 and the second speaker 112 may be compared with the signal strength of each of the audio components 2011 and 2012 included in the received audio signal 2010, and a distance from the corresponding speaker to the mobile device 205 may be calculated based on a degree of reduction in the signal strength.

Referring to FIG. 20B, the signal strength of the audio component 2012 having a frequency value corresponding to 200 Hz in the audio signal 2010 is hardly reduced compared to 70 dB, and the signal strength of the audio component 2011 having a frequency value corresponding to 100 Hz in the audio signal 2010 is reduced by about 15 dB or more compared to 70 dB. Accordingly, considering the degree to which the signal strength of each of the audio components is reduced, the location of the mobile device 205 may be identified as corresponding to the passenger seat 120.

Referring to FIG. 20C, the signal strength of an audio component 2052 having a frequency value corresponding to 200 Hz in the audio signal 2050 is reduced by about 10 dB compared to 70 dB, and the signal strength of an audio component 2051 having a frequency value corresponding to 100 Hz in the audio signal 2050 is reduced by about 25 dB or more compared to 70 dB. Accordingly, considering a degree to which the signal strength of each of the audio components is reduced, the location of the mobile device 205 may be identified as corresponding to the third seat 150.

The user location detection method and the mobile device 205 and a vehicle electronic device 300 performing the method according to an embodiment of the disclosure have been described in detail with reference to FIGS. 8 to 20C.

Figure 9:
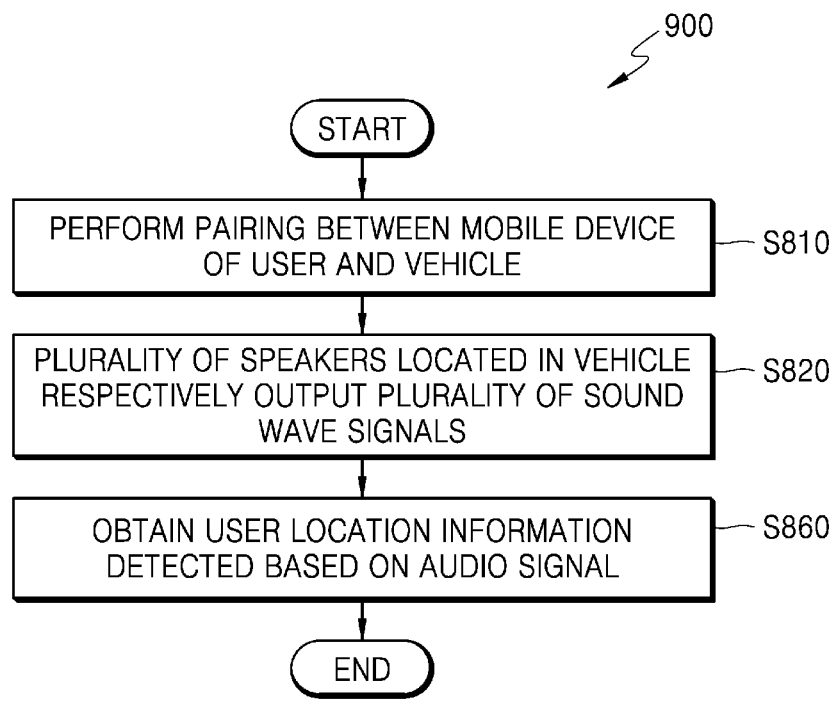
FIG. 9 is a flowchart illustrating a user location detection method according to an embodiment of the disclosure.

FIG. 9 is a flowchart illustrating a user location detection method according to an embodiment of the disclosure. FIG. 9 is a flowchart illustrating the user location detection method performed by the vehicle electronic device (e.g., 300), and the same operations as those in FIG. 8 are illustrated by using the same reference numerals. Therefore, in describing a user location detection method 900, redundant descriptions with those described above with reference to FIGS. 8 to 20C will be omitted.

Referring to FIG. 9, the user location detection method 900 is a method of detecting a location of a user located in a vehicle by a vehicle electronic device disposed in the vehicle. For convenience of description, the user location detection method 900 will be described with reference to the device components shown in FIG. 7.

In the user location detection method 900, pairing with the mobile device 205 of the user is performed (S810). Operation S810 may be performed by the communicator 230 under the control of the processor 210.

Also, in the user location detection method 900, a plurality of speakers located in the vehicle respectively output a plurality of sound wave signals which are different from each other in terms of at least one of a frequency band and a time period (S820). Operation S820 may be performed by the audio output unit 220 under the control of the processor 210.

Continuously, in the user location detection method 900, user location information detected based on an audio signal received by the mobile device 205 in correspondence to the plurality of sound wave signals is obtained (S860). Here, the user location information may be obtained by the processor 210 by analyzing information about the audio signal received by the mobile device 205. Alternatively and/or additionally, the user location information may be transmitted from the mobile device 205 through the communicator 230.

As described above, in an embodiment of the disclosure, which seat in the vehicle a determined user who legally owns or uses the mobile device 205 is located may be accurately detected, by detecting the location of the user based on the audio signal received by the mobile device 205. In addition, even when there is no additional hardware device (e.g., a sensor capable of detecting the location of the user) for user detection in the vehicle, the location of the user may be quickly and accurately detected by using only the mobile device 205 carried by the user.

Figure 21:
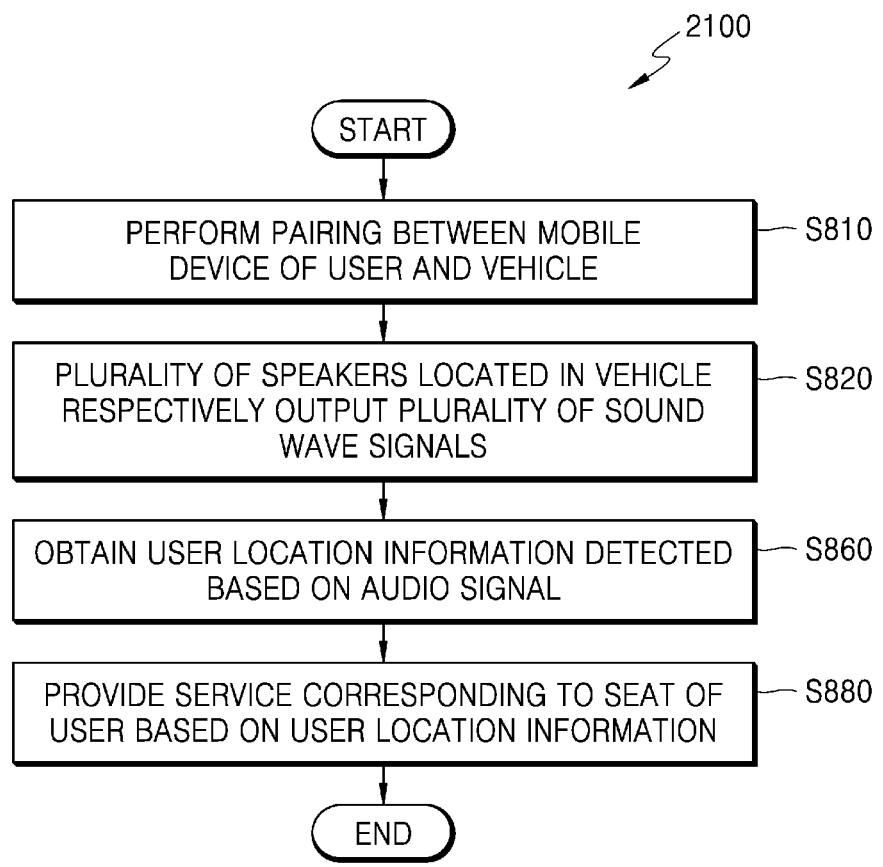
FIG. 21 is another flowchart illustrating a user location detection method according to an embodiment of the disclosure.

FIG. 21 is another flowchart illustrating a user location detection method according to an embodiment of the disclosure. FIG. 21 is the flowchart illustrating a user location detection method performed by a vehicle electronic device (e.g., 300), and the same operations as those in FIGS. 8 and 9 are illustrated by using the same reference numerals. Therefore, in describing a user location detection method 2100, redundant descriptions with those described above with reference to FIGS. 8 to 20C will be omitted.

Referring to FIG. 21, the user location detection method 2100 may further include operation S880 compared to the user location detection method 900 shown in FIG. 9.

Based on the user location information obtained in operation S860, the user location detection method 2100 may provide a service corresponding to a seat of a user (S880). Here, operation S880 may be performed under the control of the processor 210.

Here, the service corresponding to the seat of the user may be a service for providing content customized to the user. For example, the location information obtained in operation S860 may be location information of a specific user. Accordingly, the processor 210 may determine a user based on the identification information of the mobile device 205 and provide a certain service based on the detected location information of the determined user. Here, the certain service may include a content providing service provided through an IVI system.

For example, when the user is determined as a user A and it is identified that the user A is located in the second seat 130, the processor 210 allows the user A to receive content desired by the user A. Here, the content desired by the user A may be identified based on a previous content playback history of the user A. For example, the processor 210 may automatically select content that the user A has often watched, music that the user A has often listened to, and/or a game (e.g., a baseball game) that the user A likes, and provide the selected content through at least one of the display 331 or the audio output unit 220.

Figure 22:
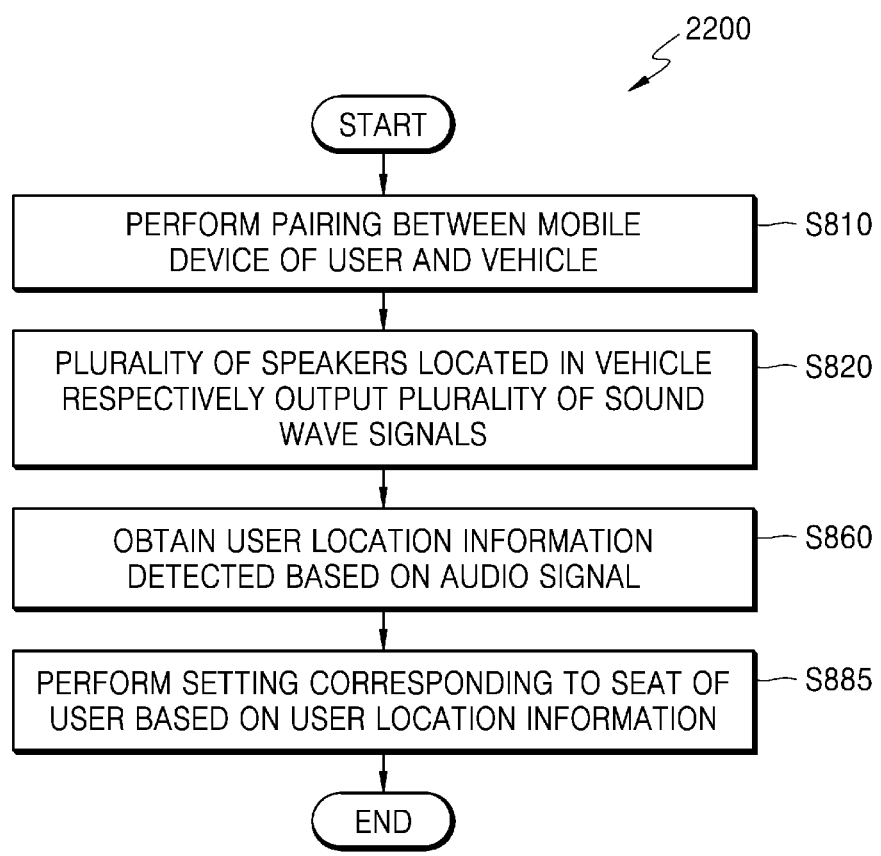
FIG. 22 is another flowchart illustrating a user location detection method according to an embodiment of the disclosure.

FIG. 22 is another flowchart illustrating a user location detection method according to an embodiment of the disclosure.

FIG. 22 is the flowchart illustrating the user location detection method performed by a vehicle electronic device (e.g., 300), and the same operations as those in FIGS. 8 and 9 are illustrated by using the same reference numerals. Therefore, in describing a user location detection method 2200, redundant descriptions with those described above with reference to FIGS. 8 to 20C will be omitted.

Referring to FIG. 22, the user location detection method 2200 may further include operation S885 compared to the user location detection method 900 shown in FIG. 9.

Based on the user location information obtained in operation S860, the user location detection method 2200 may perform setting corresponding to a seat of a user (S885). Here, operation S885 may be performed under the control of the processor 210. In addition, 'setting corresponding to the seat of the user' may include safety setting, security setting, and/or service provision setting customized for a specific user. Here, the safety setting may include descriptions of an airbag operation, a seat belt location, a tightening level, etc., necessary for driving a vehicle in accordance with a physical condition of the specific user, age, gender, etc. In addition, the security setting may be set to encrypt and decrypt information used by the determined user according to a security level required by the user when the determined user requires high security performance in providing and transmitting/receiving information related to the user. In addition, the security setting may be set to limit the type of a provided service to the service of a specific range or type considering the age of the determined user, etc. For example, when the determined user is a minor, content provided to the corresponding user may be configured to provide only content that minors may view.

Figure 23:
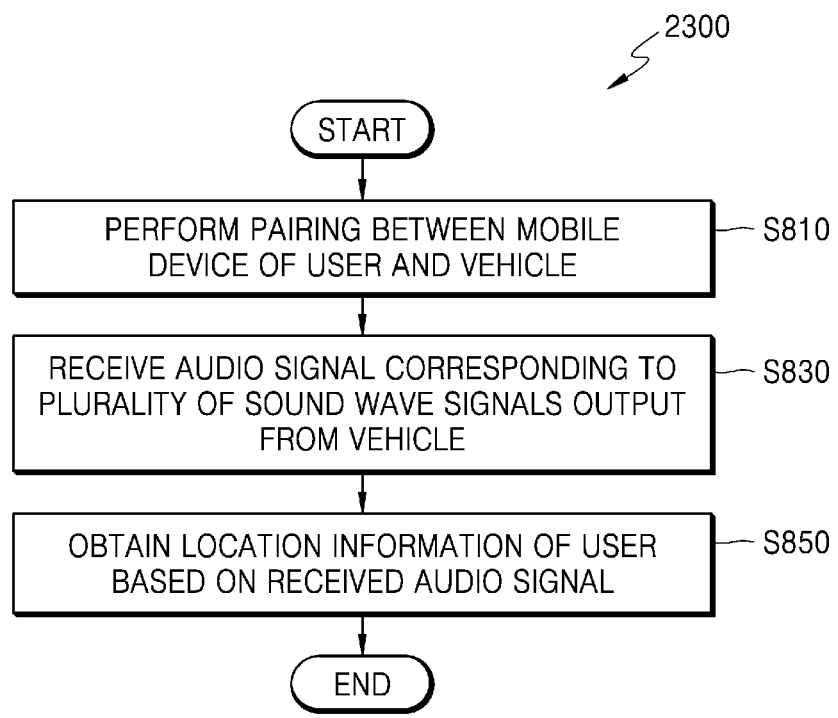
FIG. 23 is another flowchart illustrating a user location detection method according to an embodiment of the disclosure.

FIG. 23 is another flowchart illustrating a user location detection method according to an embodiment of the disclosure.

FIG. 23 is the flowchart illustrating the user location detection method performed by a mobile device (e.g., 205), and the same operations as those in FIG. 8 are illustrated by using the same reference numerals. Therefore, in describing a user location detection method 2300, redundant descriptions with those described above with reference to FIGS. 8 to 20C will be omitted.

Referring to FIG. 23, the user location detection method 2300 is a method, performed by a mobile device carried by a user riding in a vehicle, of detecting a location of the user located in the vehicle. For convenience of description, the user location detection method 2300 will be described with reference to the device components shown in FIG. 7.

In the user location detection method 2300, pairing between the user mobile device 205 and the vehicle electronic device 300 is performed (S810). Operation S810 may be performed by the communicator 410 under the control of the processor 430.

In the user location detection method 2300, an audio signal is received in correspondence to a plurality of speakers located in the vehicle outputting a plurality of sound wave signals that are different in terms of at least one of a frequency band and a time period (S830). Operation S830 may be performed by the audio input unit 420 under the control of the processor 430.

In addition, information about the audio signal received in operation S830 may be transmitted from the communicator 410 of the mobile device 205 to the communicator 230 of the vehicle electronic device 300 (operation not shown in FIG. 23, and corresponding to operation S840 shown in FIG. 8).

Based on the audio signal received in operation S830, location information of the user is acquired (S850). Operation S850 may be performed by the processor 430.

Figure 24:
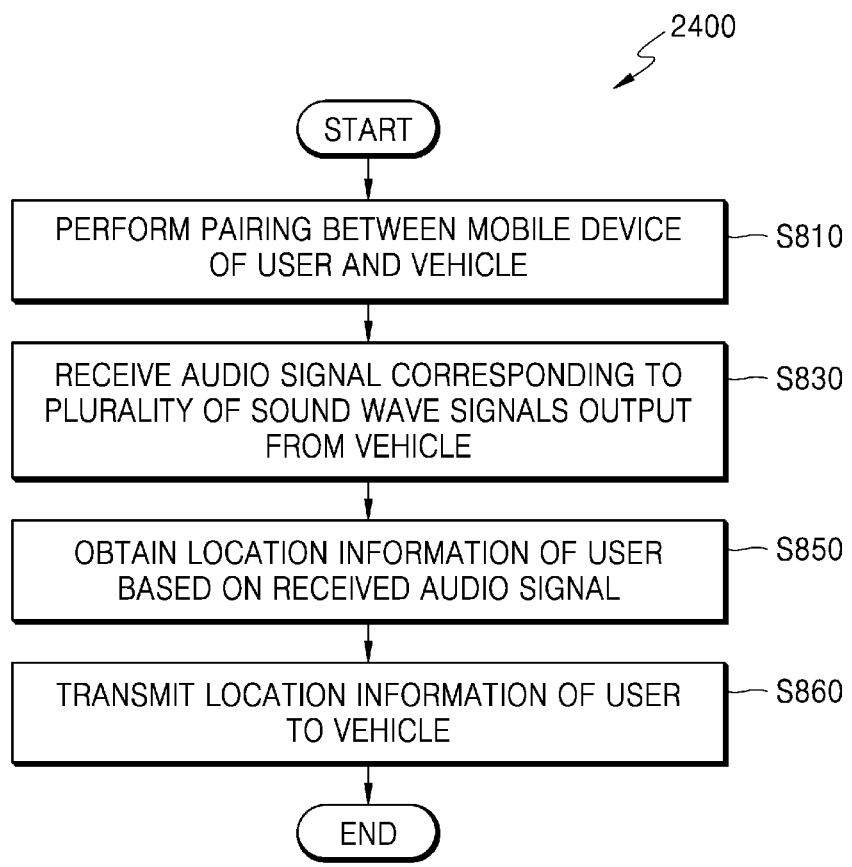
FIG. 24 is another flowchart illustrating a user location detection method according to an embodiment of the disclosure.

FIG. 24 is another flowchart illustrating a user location detection method according to an embodiment of the disclosure. FIG. 24 is the flowchart illustrating the user location detection method performed by a mobile device (e.g., 205), and the same operations as those in FIG. 8 and FIG. 23 are illustrated by using the same reference numerals. Therefore, in describing a user location detection method 2400, redundant descriptions with those described above with reference to FIGS. 8 to 23 will be omitted.

Referring to FIG. 24, the user location detection method 2400 is a method, performed by a mobile device carried by a user riding in a vehicle, of detecting a location of the user located in the vehicle. For convenience of explanation, the user location detection method 2400 will be described with reference to the device components shown in FIG. 7.

In the user location detection method 2400, subsequent to operation S850, location information of the user obtained in operation S850 may be transmitted to the vehicle (S860). Here, the vehicle may refer to the vehicle electronic device 300 installed or disposed in the vehicle.

Figure 25:
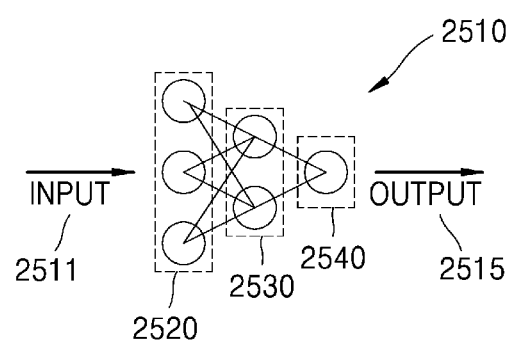
FIG. 25 is a diagram illustrating a neural network performing at least one operation of a user location detection method according to an embodiment of the disclosure.

FIG. 25 is a diagram illustrating a neural network performing at least one operation of a user location detection method according to an embodiment of the disclosure.

In an embodiment of the disclosure, the at least one of operations performed in the user location detection method may be performed using artificial intelligence (AI) technology. The at least one operation performed using the AI technology is described in detail with reference to 25 below.

Specifically, in an embodiment of the disclosure, the at least one of operations of i) extracting audio components corresponding to sound wave signals output from a speaker by removing noise from an audio signal received by a mobile device and ii) obtaining location information of a user by analyzing audio signals corresponding to a plurality of sound wave signals (for example, S850 or S860) may be performed by using the AI technology performing arithmetic operations through a neural network.

The AI technology is a technology obtaining an intended result by performing processing, such as analysis and/or classification, on input data by performing arithmetic operations through a neural network.

The AI technology may be implemented by using algorithms. Here, an algorithm or a set of algorithms for implementing AI technology are referred to as a neural network. Here, the neural network may receive an input of input data, perform arithmetic operations for analysis and classification, and output resulting data. As such, in order for the neural network to accurately output resulting data corresponding to input data, it is necessary to train the neural network. Here, 'training' may mean training a neural network such that the neural network may discover or learn on its own a method of analyzing various pieces of data input to the neural network, a method of classifying the input pieces of data, and/or a method of extracting, from the input pieces of data, features necessary for generating resulting data. Specifically, through a training process, the neural network may optimize and set weight values in the neural network by training using training data (e.g., a plurality of different images). Then, the neural network having the optimized weight values may output an intended result by learning input data by itself.

Specifically, neural networks that include a plurality of hidden layers for performing arithmetic operations, that is, the depth of which for performing arithmetic operations is high, may be classified as deep neural networks. Examples of neural networks include deep neural networks (DNNs), convolutional neural networks (CNNs), recurrent neural networks (RNNs), restricted Boltzmann machines (RBMs), deep belief networks (DBNs), bidirectional recurrent DNNs (BRDNNs), and deep Q-networks, but are not limited thereto. In addition, the neural networks may be subdivided. For example, CNNs may be subdivided into deep CNN (DCNN), capsule neural networks (CapsNets) (not shown), etc.

In an embodiment of the disclosure, an 'AI model' may refer to a neural network including at least one layer operating to receive input data and output an intended result. The 'AI model' may also refer to an algorithm or a set of a plurality of algorithms for outputting an intended result by performing arithmetic operations through a neural network, a processor for executing the algorithm or the set of algorithms, software for executing the algorithm or the set of algorithms, or hardware for executing the algorithm or the set of algorithms.

Referring to FIG. 25, a neural network 2510 may be trained by receiving training data. The training data may include the received audio signal and labels of a user location based on the received audio signal. Specifically, training data may include one or more audio components included in the received audio signal and locations of speakers respectively outputting the audio components, along with labels of a user location determined for the audio signal. The labels of the user location can be the identified seats the user is sitting in based on the received audio signal as discussed herein. In one or more embodiments, using the training data, the neural network 2510 learns to classify, for example, a seat of the user as a user location in the vehicle. In one or more embodiments, using the training data, the neural network 2510 learns to classify, for example, a particular speaker closest to the location of the user, thereby identifying the seat of the user. In one or more embodiments, using the training data, the neural network 2510 learns to classify, for example, the seat of the user based on the contribution of speakers (when there is not a one-to-one relationship between the speakers and the seats in a vehicle) to the audio signal. Then, the trained neural network 2510 may receive input data 2511 through an input end 2520, may perform arithmetic operations for analyzing the input data 2511 and outputting output data 2515, which is an intended result, through an output end 2540. The arithmetic operations through the neural network may be performed through a hidden layer 2530. Although FIG. 25 simply illustrates the hidden layer 2530 as one layer for convenience of description, the hidden layer 2530 may be formed in a plurality of layers.

Specifically, in an embodiment of the disclosure, the neural network 2510 may receive a received audio signal and learn a user location corresponding to the received audio signal. Specifically, the neural network 2510 may learn one or more audio components included in the received audio signal, and learn locations of speakers respectively outputting the audio components. Also, the neural network 2510 may learn the location of a mobile device that has received the audio signal. Alternatively and/or additionally, the neural network 2510 may learn an audio signal analysis method or criterion required to identify the location of the mobile device. Alternatively and/or additionally, the neural network 2510 may learn a method or criterion for obtaining location information of a corresponding mobile device by analyzing the received audio signal.

The trained neural network 2510 may receive the audio signal received by the mobile device and output a result including location information of the mobile device corresponding thereto.

The neural network described above may be implemented in at least one of the vehicle electronic device according to an embodiment of the disclosure or the mobile device according to an embodiment of the disclosure.

In addition, the arithmetic operation through the neural network described above may be performed by a server (not shown) capable of communicating with at least one of the vehicle electronic device according to an embodiment of the disclosure or the mobile device according to an embodiment of the disclosure through a wireless communication network. Communication between at least one of the vehicle electronic device according to an embodiment of the disclosure or the mobile device according to an embodiment of the disclosure and the server (not shown) will be described in detail with reference to FIGS. 26 and 27 below.

Figure 26:
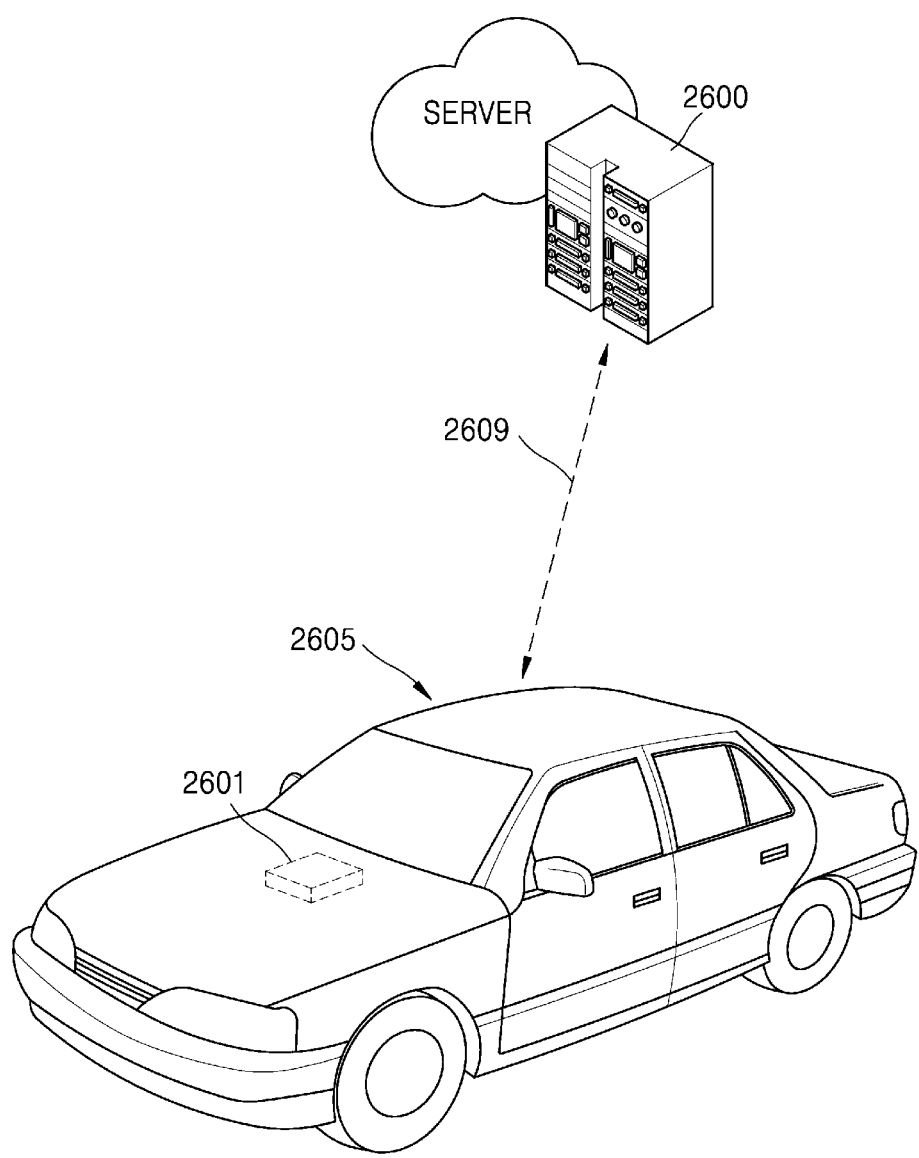
FIG. 26 is a diagram illustrating communication between a server and at least one of a vehicle electronic device or a mobile device according to an embodiment of the disclosure.

FIG. 26 is a diagram illustrating communication between a server and at least one of a vehicle electronic device or a mobile device according to an embodiment of the disclosure.

The vehicle electronic device 2601 shown in FIG. 26 may correspond to the vehicle electronic device 200, 300, or 401 according to an embodiment of the disclosure described with reference to FIGS. 1 to 24. In addition, the mobile devices 205 and 500 according to an embodiment of the disclosure may be located in a vehicle 2605. Therefore, in describing the components shown in FIG. 26, redundant descriptions with those described above with reference to FIGS. 1 to 25 will be omitted.

In an embodiment of the disclosure, user location information (specifically, location information of a mobile device located in a vehicle) may be calculated by a server 2600 and then transmitted to a vehicle electronic device 2601 located in the vehicle 2605 or a mobile device (not shown) of the user. In addition, the server 2600 may include a server, a server system, and a server-based device that transmits and receives data to and from an electronic device, for example, the vehicle electronic device 2601, and processes the data through a communication network.

In an embodiment of the disclosure, the server 2600 may include the neural network 2510 described in FIG. 25. Specifically, the neural network 2510 included in the server 2600 may be a trained neural network, receive input data, perform arithmetic operations through the neural network 2510, and output desired results.

The server 2600 may receive an audio signal received by a mobile device (not shown) and input the audio signal to a neural network. Then, the neural network may output user location information by analyzing the received audio signal.

The server 2600 may transmit information obtained by performing arithmetic operations through a neural network, for example, user location information, through a wireless network 2609 to the vehicle electronic device 2601 or the mobile device (not shown) of the user located in the vehicle 2605.

Figure 27:
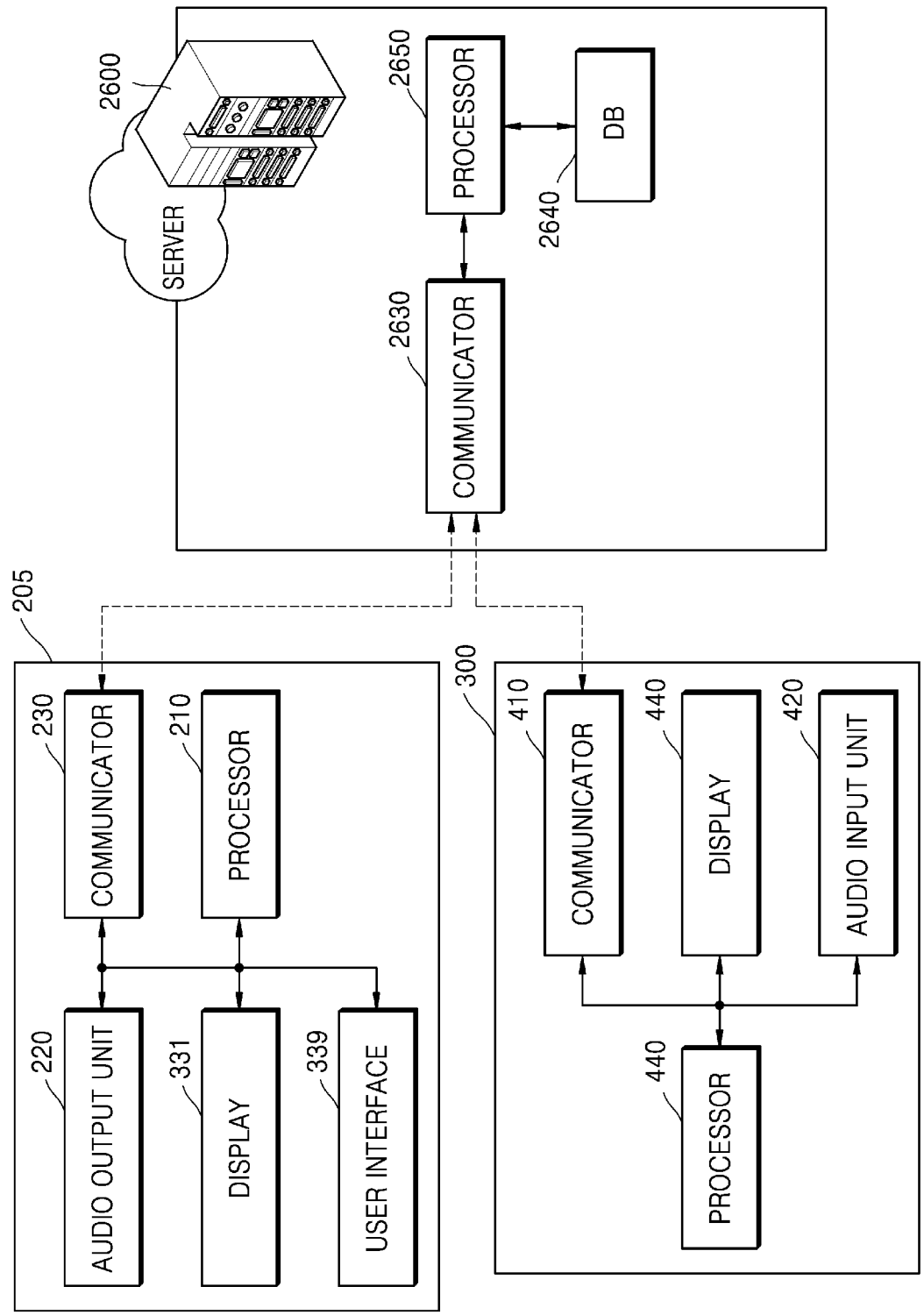
FIG. 27 is a block diagram illustrating a server according to an embodiment of the disclosure.

FIG. 27 is a block diagram illustrating a server according to an embodiment of the disclosure.

In the components shown in FIG. 27, the same configurations as those in FIGS. 1 to 25 are illustrated by using the same reference numerals. Therefore, redundant descriptions with those described above will be omitted. Specifically, the server 2600 may communicate with at least one of a mobile device (e.g., 205) or the vehicle electronic device 2601 according to an embodiment of the disclosure through a wireless communication network.

Referring to FIG. 27, the server 2600 includes a communicator 2630 communicating with an external electronic device (e.g., a mobile device (e.g., 205) and the vehicle electronic device 2601), and a processor 2650 that executes at least one instruction. Also, the server 2600 may further include a database (DB) 2640.

The communicator 2630 may include one or more components that enable communication with an external electronic device. A specific configuration of the communicator 2630 corresponds to the configuration of the communicator 230 or 410 included in the mobile device (e.g., 205) and the vehicle electronic device 2601, respectively, and thus a detailed description thereof will be omitted.

For example, the communicator 2630 may include at least one communication module configured to perform communication with another device (e.g., the vehicle electronic device 2601) located in a remote location, through a communication network conforming to a communication standard such as the Internet, 3G, 4G, and/or 5G.

The processor 2650 controls the overall operation of the server 2600. For example, the processor 2650 may perform required operations by executing at least one of at least one instruction or programs of the server 2600.

The processor 2650 may obtain the above-described user location information by performing arithmetic operations through the neural network; the processor 2650 may control the communicator 2630 to transmit the obtained information to at least one of the vehicle electronic device 2601 or the mobile device 205.

Specifically, the processor 2650 may train a neural network, which is an AI model, and store the trained neural network. And, the server 2600 may obtain the user location information using a trained neural network.

In general, the vehicle electronic device 2601 and the mobile device 205 may have limited memory storage capacity, arithmetic operation processing speed, and ability for collecting training data set compared to the server 2600. Therefore, an operation requiring a large data storage and a large arithmetic operation amount may be performed by the server 2600, and then required data and/or an AI model to be used, or the trained neural network may be transmitted to at least one of the vehicle electronic device 2601 or the mobile device 205 through a communication network. Then, at least one of the vehicle electronic device 2601 or the mobile device 205 may rapidly and easily perform a required operation without a large-capacity memory and a high-speed processor, by receiving and using the required data and AI model from the server.

Figure 28:
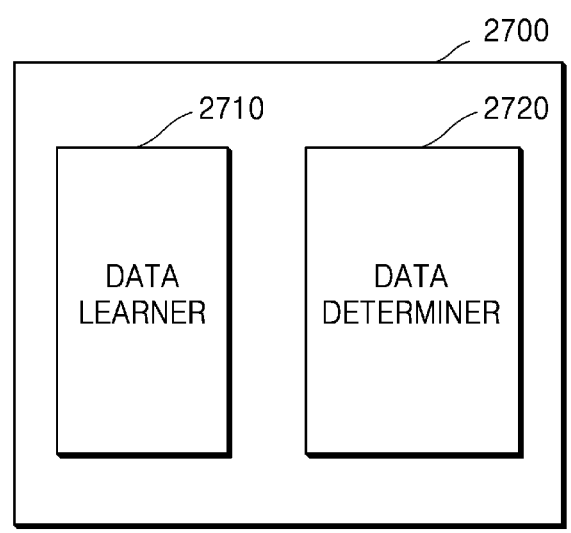
FIG. 28 is a diagram showing a processor of a server in detail according to an embodiment of the disclosure.

FIG. 28 is a diagram showing a processor of a server in detail according to an embodiment of the disclosure.

A processor 2700 shown in FIG. 28 may correspond to a processor (e.g., 210 or 440) included in the vehicle electronic device 2601 and the mobile device 205 or the processor 2650 of the server 2600 described above with reference to FIGS. 26 and 27. Also, the processor 2700 may be a processor that performs arithmetic operations through the neural network described in FIG. 25.

Referring to FIG. 28, the processor 2700 may include a data learner 2710 and a data determiner 2720.

The data learner 2710 may learn criteria for analyzing or determining input data in order to derive a target result. The data learner 2710 may obtain data to be used for learning, and apply the obtained data to a data determination model, thereby learning the reference for determining a situation.

The data determiner 2720 may determine the situation based on the input data. The data determiner 2720 may determine the situation from certain data using the trained data determination model. The data determiner 2720 may obtain certain data according to a preset reference by learning and use the data determination model having the obtained data as input values, thereby determining a certain situation based on the certain data. In addition, a resultant value output by the data determination model having the obtained data as the input value may be used to refine the data determination model.

At least one of the data learner 2710 or the data determiner 2720 may be manufactured in the form of at least one hardware chip and mounted on an electronic device. For example, at least one of the data learner 2710 or the data determiner 2720 may be manufactured in the form of a dedicated hardware chip for AI or may be manufactured as a part of an existing general purpose processor (e.g. a CPU or an application processor) or a graphics-only processor (e.g., a GPU) and mounted on the electronic device.

In this case, the data learner 2710 and the data determiner 2720 may be mounted on one electronic device or may be mounted on separate electronic devices. For example, one of the data learner 2710 and the data determiner 2720 may be included in a vehicle antenna device, and the other may be included in a server. In addition, the data learner 2710 and the data determiner 2720 may provide model information constructed by the data learner 2710 to the data determiner 2720 by wired or wirelessly, and provide data input to the data determiner 2720 to the data learner 2710 as additional training data.

Meanwhile, at least one of the data learner 2710 or the data determiner 2720 may be implemented as a software module. When at least one of the data learner 2710 or the data determiner 2720 is implemented as the software module (or a program module including an instruction), the software module may be stored in non-transitory computer readable media. In addition, in this case, at least one software module may be provided by an operating system (OS) or by a certain application. Alternatively, one of the at least one software module may be provided by the OS, and the other one may be provided by the certain application.

The user location detection method according to an embodiment of the disclosure may be embodied as program instructions executable by various computer devices, and recorded on a computer-readable medium. In addition, an embodiment of the disclosure may be implemented in a computer-readable recording medium having recorded thereon one or more programs including instructions for executing the user location detection method.

The computer-readable medium may include program instructions, data files, data structures, etc. separately or in combinations. The program instructions to be recorded on the medium may be specially designed and configured for the disclosure or may be well-known to and be usable by those skill in the art of computer software. Examples of the computer-readable recording medium include magnetic media such as hard disks, floppy disks, or magnetic tapes, optical media such as compact disc ROMs (CD-ROMs) or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter.

Here, the machine-readable storage medium may be provided in a form of a non-transitory storage medium. Here, the term 'non-transitory storage medium' refers to a tangible device and does not include a signal (e.g., an electromagnetic wave), and does not distinguish between a case where data is stored in a storage medium semi-permanently and a case where data is stored temporarily. For example, the non-transitory storage medium may include a buffer in which data is temporarily stored.

According to an embodiment of the disclosure, the user location detection method according to various embodiments of the disclosure disclosed herein may be included in a computer program product and provided. The computer program product may be traded between a seller and a purchaser as a commodity. The computer program product may be distributed in a form of a machine-readable storage medium (e.g., compact disk read only memory (CD-ROM)), or may be distributed online (e.g., downloaded or uploaded) through an application store (e.g., PlayStore™) or directly between two user devices (e.g., smart phones). In the case of online distribution, at least a part of the computer program product (e.g., a downloadable app) may be temporarily stored in a machine-readable storage medium such as a server of a manufacturer, a server of an application store, or a memory of a relay server.

Specifically, the computer program product may be implemented as a computer program product including a recording medium in which a program for performing the user location detection method according to the embodiment is stored.

Although embodiments have been described above in detail, the scope of the disclosure is not limited thereto, and various modifications and alterations by those skill in the art using the basic concept of the disclosure defined in the following claims also fall within the scope of the disclosure.

The invention claimed is:

1. A user location detection method of detecting a location of a user located in a vehicle, the user location detection method comprising:
   performing pairing between a mobile device of the user and the vehicle;
   outputting a plurality of sound wave signals respectively from a plurality of speakers located in the vehicle, the plurality of sound wave signals being different from each other in at least one of a frequency band and a time period; and
   obtaining user location information, the user location information comprising a user location detected based on an audio signal received by the mobile device in correspondence to the plurality of sound wave signals, wherein the obtaining of the user location information comprises: filtering at least one audio component corresponding to at least one frequency band from the received audio signal; identifying at least one speaker corresponding to the filtered at least one audio component; and identifying a seat in the vehicle corresponding to the identified at least one speaker.

2. The user location detection method of claim 1, wherein the obtaining of the user location information of the user is based on identification information of the mobile device.

3. The user location detection method of claim 1, wherein the obtaining of the user location information includes detecting the user location based on at least one of a signal strength and a reception time of at least one audio component corresponding to at least one frequency value included in the audio signal.

4. The user location detection method of claim 1, wherein the performing of the pairing includes transmitting, performed by a vehicle electronic device, a signal for triggering the audio signal to be recorded in the mobile device to the mobile device.

5. The user location detection method of claim 4, wherein the transmitting of the signal for triggering the audio signal includes advertising a Bluetooth Low Energy (BLE) signal requesting recording based on an event corresponding to riding of the user.

6. The user location detection method of claim 1, wherein the performing of the pairing includes receiving, performed by a vehicle electronic device, a signal requesting output of the plurality of sound wave signals from the mobile device.

7. The user location detection method of claim 1, wherein the obtaining of the user location information includes:
   the vehicle receiving information about the audio signal; and
   identifying, performed by the vehicle, a seat in which the user is located among a plurality of seats disposed in the vehicle, based on the information about the audio signal.

8. The user location detection method of claim 1, further comprising:
   obtaining, performed by the mobile device, output information about the plurality of sound wave signals,
   wherein an identifying of the user location includes identifying, performed by the mobile device, a seat in which the user is located among a plurality of seats disposed in the vehicle, based on the received audio signal and the output information.

9. The user location detection method of claim 1, wherein the outputting of the plurality of sound wave signals includes outputting the plurality of sound wave signals having different frequencies during a same time period.

10. The user location detection method of claim 1, wherein the outputting of the plurality of sound wave signals includes outputting, respectively performed by the plurality of speakers, the plurality of sound wave signals having a same frequency at a plurality of different time points.

11. The user location detection method of claim 1, wherein the outputting of the plurality of sound wave signals includes outputting, respectively performed by the plurality of speakers, the plurality of sound wave signals having a same frequency and having different sound wave patterns.

12. A vehicle electronic device comprising:
an audio output unit comprising a plurality of speakers;
a communicator configured to perform communication through a wireless communication network;
at least one processor; and
memory storing instructions that, when executed by the at least one processor individually or collectively, cause the vehicle electronic device to:
perform pairing, through the communicator, with a mobile device of a user located in a vehicle,
output respectively, through each of the plurality of speakers, a plurality of sound wave signals which are different from each other in at least one of a frequency band and a time period, and
obtain user location information, the user location information comprising a user location detected based on an audio signal received by the mobile device in correspondence to the plurality of sound wave signals, wherein the user location information is obtained by filtering at least one audio component corresponding to at least one frequency band from the received audio signal, and identifying a seat in the vehicle based on at least one speaker corresponding to the filtered at least one audio component.

13. The vehicle electronic device of claim 12, wherein the user location information is information obtained based on at least one of a signal strength and a reception time of at least one audio component corresponding to at least one frequency value included in the received audio signal.

14. A mobile device of a user located in a vehicle, the mobile device comprising:
an audio input unit;
a communicator configured to perform communication through a wireless communication network; and
at least one processor; and
memory storing instructions that, when executed by the at least one processor individually or collectively, cause the mobile device to:
perform pairing, through the communicator, with a vehicle electronic device,
receive, through the audio input unit, an audio signal in correspondence to a plurality of sound wave signals respectively output from a plurality of speakers located in the vehicle, the plurality of sound wave signals being different from each other in at least one of a frequency band and a time period,
filter at least one audio component corresponding to at least one frequency band from the received audio signal,
identify at least one speaker corresponding to the filtered at least one audio component,
identify a seat in the vehicle corresponding to the identified at least one speaker, and
obtain information about a location of the user based on the identified seat.

\* \* \* \* \*